US012161959B2

(12) United States Patent
Willems

(10) Patent No.: US 12,161,959 B2
(45) Date of Patent: *Dec. 10, 2024

(54) SPIN-ON FLUID TREATMENT DEVICE AND METHODS

(71) Applicant: Donaldson Company, Inc., Minneapolis, MN (US)

(72) Inventor: Gert Willems, Wilsele (BE)

(73) Assignee: Donaldson Company, Inc., Bloomington, MN (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/302,790

(22) Filed: May 12, 2021

(65) Prior Publication Data

US 2021/0331100 A1 Oct. 28, 2021

Related U.S. Application Data

(63) Continuation of application No. 16/100,894, filed on Aug. 10, 2018, now Pat. No. 11,014,026.

(30) Foreign Application Priority Data

Aug. 11, 2017 (EP) ..................................... 17186061

(51) Int. Cl.
*B01D 35/00* (2006.01)
*B01D 27/08* (2006.01)
(Continued)

(52) U.S. Cl.
CPC ........... *B01D 35/005* (2013.01); *B01D 27/08* (2013.01); *B01D 27/144* (2013.01);
(Continued)

(58) Field of Classification Search
CPC .... B01D 35/005; B01D 27/08; B01D 27/144; B01D 35/306; B01D 35/308;
(Continued)

(56) References Cited

U.S. PATENT DOCUMENTS 3,307,705 A 3/1967 Halmenschlager
3,390,780 A 7/1968 Bennett
(Continued)

FOREIGN PATENT DOCUMENTS

DE 102011009925 A1 8/2012
DE 212012000042 U1 9/2013
(Continued)

OTHER PUBLICATIONS

Search Report for European Patent Application No. 17186061.2 (dated Feb. 12, 2018).
(Continued)

*Primary Examiner* — Madeline Gonzalez
(74) *Attorney, Agent, or Firm* — Merchant & Gould P.C.

(57) ABSTRACT

The disclosure pertains to a spin-on fluid treatment device, including a treatment medium disposed within a housing, a top surface having an internally threaded bore and an outlet tube at least partially disposed inside said threaded bore in a concentric position. The outlet tube can have an externally oriented sealing portion for engaging with a complementary element of an inlet spud of an entity that receives said treated fluids. The outlet tube can be configured as an alignment feature to guide the treatment device onto the inlet spud during installation. The outlet tube can be configured with both an externally oriented sealing portion and an alignment feature. The disclosure also pertains to a system comprising a machine having a treatment device head and a spin-on fluid treatment device, a kit, a spin-on fluid filter cartridge, and a method of mounting a spin-on filter cartridge onto a filter head.

10 Claims, 18 Drawing Sheets

(51) Int. Cl.
*B01D 27/14* (2006.01)
*B01D 35/30* (2006.01)
*F01M 11/03* (2006.01)

(52) U.S. Cl.
CPC ......... *B01D 35/306* (2013.01); *B01D 35/308* (2013.01); *F01M 11/03* (2013.01); *B01D 2201/291* (2013.01); *B01D 2201/298* (2013.01); *B01D 2201/302* (2013.01); *B01D 2201/305* (2013.01); *B01D 2201/342* (2013.01); *B01D 2201/347* (2013.01); *B01D 2201/4023* (2013.01); *B01D 2201/4092* (2013.01)

(58) Field of Classification Search
CPC ........ B01D 2201/291; B01D 2201/298; B01D 2201/302; B01D 2201/305; B01D 2201/342; B01D 2201/347; B01D 2201/4023; B01D 2201/4092; B01D 35/30; F01M 11/03; F16N 39/06; F16N 2039/065
USPC ... 210/348, 440, 443, DIG. 17, 167.02, 450, 210/442, 444
See application file for complete search history.

(56) References Cited

U.S. PATENT DOCUMENTS

| | | | |
|---|---|---|---|
| 5,078,877 A | 1/1992 | Cudaback et al. | |
| 5,922,186 A | 7/1999 | Shukla et al. | |
| 5,922,196 A | 7/1999 | Bauman | |
| 5,984,144 A | 11/1999 | Wyatt | |
| 5,985,144 A | 11/1999 | Janik et al. | |
| 6,391,193 B1 * | 5/2002 | Luka | B01D 27/103 210/DIG. 17 |
| 6,471,071 B1 | 10/2002 | Shoaf et al. | |
| 7,186,338 B2 | 3/2007 | Boisvert | |
| 7,390,407 B2 | 6/2008 | Weindorf et al. | |
| 9,067,156 B2 | 6/2015 | Moore et al. | |
| 9,504,943 B2 | 11/2016 | Girondi | |
| 9,511,314 B2 | 12/2016 | Allott et al. | |
| 9,700,818 B2 | 7/2017 | Marshall et al. | |
| 11,014,026 B2 * | 5/2021 | Willems | F16N 39/06 |
| 2011/0308212 A1 * | 12/2011 | Ruhland | B01D 46/64 55/498 |
| 2013/0043181 A1 | 2/2013 | Krull | |
| 2016/0001204 A1 | 1/2016 | Honermann et al. | |

FOREIGN PATENT DOCUMENTS

| | | |
|---|---|---|
| DE | 202013011841 U1 | 3/2015 |
| EP | 0925815 A1 | 6/1999 |
| EP | 1753697 B1 | 11/2010 |
| JP | S59-102110 U | 7/1984 |
| WO | 9722396 A1 | 6/1997 |
| WO | 2005/102492 A1 | 11/2005 |
| WO | 2007/067791 A2 | 6/2007 |
| WO | 2008/118939 A1 | 10/2008 |
| WO | 2013/028320 A2 | 2/2013 |
| WO | 2013/036560 A1 | 3/2013 |
| WO | 2013/188036 A1 | 12/2013 |
| WO | 2015/004106 A1 | 1/2015 |
| WO | 2015/040479 A2 | 3/2015 |
| WO | 2015/156760 A1 | 10/2015 |
| WO | 2019/014211 A1 | 1/2019 |
| WO | 2019/032440 A1 | 2/2019 |

OTHER PUBLICATIONS

International Search Report and Written Opinion for Application No. PCT/US2018/046286 dated Jan. 3, 2019.

* cited by examiner

SPIN-ON FLUID TREATMENT DEVICE AND METHODS

CROSS-REFERENCE TO RELATED APPLICATIONS

This application is a continuation of application Ser. No. 16/100,894, filed Aug. 10, 2018, now U.S. Pat. No. 11,014, 026. U.S. application Ser. No. 16/100,804 claims the benefit of European Patent Office Application Serial No. EP17186061.2, filed on 11 Aug. 2017. The disclosures of each of the above applications are incorporated herein by reference in their entireties. A claim of priority is made to each of the above-referenced applications to the extent appropriate.

TECHNICAL FIELD

The present disclosure pertains to fluid treatment systems, in particular replaceable spin-on filters for filtering liquids such as fuel, oil, other engine fluids, hydraulic fluids, and the like.

BACKGROUND

A filter of the spin-on type typically has a central orifice in its top surface, provided with a metal inner thread that is arranged to engage with a hollow threaded metal cylinder on the engine or machine, through which the filtered liquid is returned. If the liquid to be filtered is sufficiently viscous and the threads are produced with sufficiently low tolerances, the engaged threaded metal parts will form a sufficient seal between the clean (untreated) flow path of the fluid inside the filter housing and the dirty (treated) flow path of the fluid inside the filter housing to avoid substantial bypass of fluid from the dirty (untreated) side to the clean (treated) side without passing through the treatment medium. One or more further orifices are provided in the top surface, radially removed from the central orifice, for receiving the dirty fluid. An axial seal creates the seal between the fluid in the filter housing and the outside environment.

Spin-on filters in the prior art include: WO 2013/188036 A1; WO 2015/156760 A1; and WO 2013/028320 A2.

It is a disadvantage of the known spin-on filters that any impurities, such as plastic or metal particles, that are present at the interface (and in particular on the threaded surfaces) prior to installation of the filter, may end up inside the clean side of the filter after installation and thus reach the machine or engine during operation.

Furthermore, impurities can be formed by the metal to metal thread engagement during the installation of the filter and part of these impurities might end up inside the clean side of the filter.

Improvements over the prior art are desirable.

SUMMARY

According to an aspect of the present disclosure, there is provided a spin-on fluid treatment device, comprising a housing, a top surface, said top surface having an internally threaded bore, at least one inlet orifice radially removed from said threaded bore, and an axial seal surrounding said at least one inlet orifice; wherein an outlet tube is at least partially disposed inside said threaded bore in a concentric position, wherein a treatment medium is arranged inside said housing to treat fluids entering through said at least one inlet orifice and leaving through said outlet tube; and wherein said outlet tube is provided with an externally oriented sealing portion configured for engaging with a complementary element of an inlet spud of an entity that receives said treated fluids.

The term "radially removed" as used herein implies that the inlet orifice is located wholly outside of the internally threaded bore. The term "externally oriented" is used herein to indicate that the sealing portion operates in an upward and/or radially outward direction. The housing may be substantially cylindrical. The internally threaded bore may be centrally arranged in said top surface.

It is an advantage of the present disclosure that the inner thread of the threaded bore of the device according to the disclosure and the outer thread of the connecting snout of the machine remain isolated from the clean side of the device during and after installation, thus avoiding the contamination of the clean side of the device by impurities present on these threaded surfaces.

Throughout the present application, where reference is made to avoiding the presence of impurities, this includes avoiding the presence of impurities having a size in excess of a certain threshold, such as for example a threshold of 500 µm, preferably a threshold of 100 micron. Impurities of this threshold size can be avoided without the use of a separate sealing member as the line-contact engagement between, for example, the plastic outlet tube of the filter cartridge and the metal inlet tube of the machine head will form a sufficient seal.

In some applications, where a seal member such as an O-ring is provided on the outlet tube, avoiding the presence of impurities may further include having a size in excess of a certain lower threshold, such as for example a threshold of 50 µm, preferably a threshold of 5 micron.

In an embodiment of the spin-on fluid treatment device according to the present disclosure, the sealing portion has at least an axial component.

In an embodiment of the spin-on fluid treatment device according to the present disclosure, the sealing portion has at least a radial component.

In a particular embodiment, the outlet tube is formed as a substantially cylindrical tube, the wall of which is rounded at the open top end, and the radial component includes an outwardly oriented part of the rounded wall.

This embodiment is particularly suited for use with an outlet tube made of metal. However, it is also possible to use other materials for the outlet tube, including plastic, zamac, or elastomers.

In another particular embodiment, the outlet tube is formed as a substantially cylindrical tube, the wall of which is tapered at the open top end so as to form a conical surface, and the radial component includes the conical surface.

This embodiment is particularly suited for use with an outlet tube made of plastic.

In another particular embodiment, the outlet tube is formed as a substantially frustoconical tube, and the radial component includes an outer surface of the substantially frustoconical tube.

This embodiment is particularly suited for use with an outlet tube made of plastic.

In an embodiment of the spin-on fluid treatment device according to the present disclosure, said treatment medium is arranged in a cartridge inside said housing, said cartridge being pushed towards said top surface by a resilient element.

In a particular embodiment, the outlet tube has an ending in a shape that has no cylindrical symmetry, configured to be sealing with a corresponding shape of the complementary element.

This solution is particularly suitable for spin-on products where a resilient element disposed between the cartridge and the housing creates the required axial force to assure a proper sealing arrangement. The cartridge can rotate within the spin-on housing as it is just pressed in between the resilient element and the top surface (baffle plate). In this way it is possible to use a non-circularly symmetric shape, e.g. an obround shape, as the cartridge with the outlet tube will orient itself automatically and still create a good seal.

In a particular embodiment, the outlet tube is movable in an axial direction relative to the top surface.

This solution is particularly suitable for a spin-on filter where a resilient element disposed between the cartridge and the housing creates the required axial force to assure a proper sealing arrangement. Accordingly, the outlet tube can move down inside the housing when the spin-on is being inserted.

In an embodiment of the spin-on fluid treatment device according to the present disclosure, the externally oriented sealing portion is positioned at least partially within the volume defined by the lower end of the threaded bore and the top surface.

It is an advantage of this embodiment that accidental touching and contamination of the sealing portion during handling of the device can be avoided.

In a particular embodiment of the spin-on fluid treatment device according to the present disclosure, the externally oriented sealing portion is positioned, when installed, at least partially within the volume defined by the lower end of the threaded bore and the top surface.

In an embodiment of the spin-on fluid treatment device according to the present disclosure, the treatment medium is a filter medium.

According to an aspect of the present disclosure, there is provided system comprising a machine having a treatment device head and a spin-on fluid treatment device; wherein said spin-on fluid treatment device comprises a substantially cylindrical housing with a top surface, said top surface having a centrally arranged internally threaded bore, at least one inlet orifice radially removed from said threaded bore, and an axial seal surrounding said at least one inlet orifice, a treatment medium being arranged inside said housing to treat fluids entering through said at least one inlet orifice and leaving through said outlet tube; wherein said treatment device head comprises at least one head outlet orifice configured to achieve fluid communication with the at least one inlet orifice of the spin-on treatment device and a head inlet orifice configured to achieve fluid communication with the outlet orifice of the spin-on treatment device, said head inlet orifice being provided in a snout with a threaded outer surface configured to engage with the threaded bore of the spin-on fluid treatment device; wherein an outlet tube is at least partially disposed inside said threaded bore in a concentric position; and wherein said outlet tube is provided with an externally oriented sealing portion, configured for engaging with a complementary element of the head inlet orifice.

According to an aspect of the present disclosure, there is provided a kit comprising: a spin-on fluid treatment device comprising a substantially cylindrical housing with a top surface, said top surface having a centrally arranged internally threaded bore, at least one inlet orifice radially removed from said threaded bore, and an axial seal surrounding said at least one inlet orifice, a treatment medium being arranged inside said housing to treat fluids entering through said at least one inlet orifice and leaving through an outlet orifice; and a part 102 forming an extension tube or outlet tube 110 with an externally oriented sealing portion, configured for engaging with a complementary element of the inlet orifice 210 of an entity that receives said treated fluids; wherein said part is adapted to be installable onto said spin-on fluid treatment device such that said outlet tube is at least partially disposed inside said threaded bore or outlet 130 in a concentric position and in sealed fluid communication with said outlet orifice.

An aspect of this disclosure concerns a spin-on fluid filter cartridge for threaded connection with a spud of a filter head. The filter cartridge comprises a housing having a surrounding wall, an interior volume, and a cover piece at an end of the surrounding wall and covering the interior volume; the cover piece including a central bore and an inlet arrangement radially spaced from the central bore; the central bore and the inlet arrangement being in communication with the interior volume; the central bore having internally disposed threads; the central bore being sized and configured to thread onto an externally threaded spud of a filter head. The filter cartridge further comprises an axial seal member located on an exterior of the cover piece and surrounds the inlet arrangement and is oriented to form a seal with the filter head, when the filter cartridge is operably connected to the filter head. The filter cartridge further comprises a filter element operably oriented in the interior volume of the housing. The filter element has a tubular media pack of filter media surrounding a clean fluid volume; the media pack being secured to an end cap at a first end of the element; an outlet tube axially extending away from a remaining portion of the filter element and integral with or secured to the end cap; the outlet tube being in communication with the clean fluid volume; and wherein the outlet tube forms a seal between and against the outlet tube and an internal surface of the filter head spud, when the filter cartridge is connected to the filter head.

In some example embodiments, the seal between the outlet tube and the internal surface of the filter head spud is at least an axial seal between a free end of the outlet tube and the internal surface of the filter head. The free end can be rounded, or the free end can be tapered.

The seal between the outlet tube and the internal surface of the filter head spud can further include a radial seal between and against an outer portion of the outlet tube and the internal surface of the filter head spud.

In some example embodiments, the outlet tube has a frustoconical shape.

In one or more embodiments, the radial seal is formed by an O-ring seal member projecting from the outer portion of the outlet tube.

In examples, the filter cartridge further includes a resilient element urging the filter element toward the cover piece.

The outlet tube can be a separate piece from a remaining part of the filter element and is sealed to the end cap.

It should be noted that the sealing to the end cap should be sufficient to support the desired filtering efficiency; such sealing may be achieved with or without a separate sealing component such as an O-ring.

An aspect of this disclosure includes a filter assembly comprising a filter head having an externally threaded spud; the spud having an internally directed sealing surface; a filter cartridge as variously characterized above and removably attached to the filter head, the internal threads of the central bore of the cover piece mating with the external threads of the spud. The outlet tube extends into the spud and forms a seal between and against the sealing surface of the spud and the outlet tube.

In examples, the sealing surface of the spud includes an inwardly angled surface.

In one or more embodiments, the sealing surface of the spud is a planar surface at a right angle to a remaining portion of the internal surface of the spud.

In example implementations, the cover piece includes a depressed portion angled inwardly toward the filter element; and when the filter cartridge is operably connected to the filter head, the filter element is axially spaced apart from engagement with the depressed portion.

The filter assembly can include a resilient element urging the filter element toward the cover piece.

In some examples, an internal surface of the spud is frustoconical; and the outlet tube has a frustoconical shape.

An aspect of this disclosure is directed to a method of mounting a spin-on filter cartridge onto a filter head. The method includes providing a filter head having an externally threaded spud; the spud having an internally directed sealing surface; providing a filter cartridge having a housing holding a filter element, the housing having a cover piece with a central bore with internally directed threads; the filter element having an outlet tube; connecting the filter cartridge to the filter head by threadably mating the internal threads of the central bore and the external threads of the spud; directing the outlet tube into the spud.

In one example, the method further includes forming a seal between and against the outlet tube and an internal surface of the spud.

In one example, the method step of directing the outlet tube into the spud includes aligning the outlet tube into the spud with an alignment feature defined on the outlet tube. In one example, the alignment feature is a chamfered end or curved end of the outlet tube. In one example, a spin-on fluid treatment device is provided that includes a housing, a top surface, said top surface having an internally threaded bore, at least one inlet orifice radially removed from said threaded bore, and an axial seal surrounding said at least one inlet orifice. An outlet tube can also be provided that is at least partially disposed inside said threaded bore in a concentric position, wherein a treatment medium is arranged inside said housing to treat fluids entering through said at least one inlet orifice and leaving through said outlet tube.

In one example, the outlet tube is provided with an externally oriented sealing portion and is configured for engaging with a complementary element of an inlet spud of an entity that receives said treated fluids.

In one example the outlet tube extends axially beyond the threaded bore such that the outlet tube performs an alignment function between the threaded bore and the inlet spud by first contacting the inlet spud prior to engagement of the threads.

In some examples, the outlet tube includes an externally oriented sealing portion and extends axially beyond the threaded bore.

In one example, a spin-on fluid cartridge is provided that has a housing defining a plurality of inlet orifices surrounding a threaded outlet with inwardly facing threads, and that has a filter medium disposed within the housing. In one aspect, the fluid cartridge can include an extension tube being at least partially disposed within and spaced from the threaded outlet.

In some examples, the extension tube extends axially beyond the threaded outlet to define an alignment feature. In some examples, the extension tube extends from below the threaded outlet to axially beyond the threaded outlet.

In some examples, the alignment feature is defined by a chamfered end or a curved end of the extension tube.

In some examples, the extension or outlet tube includes both an alignment feature and a first sealing member. In some examples, the extension tube includes only one of an alignment feature and a first sealing member.

In some examples, the extension tube defines a first sealing member. In some examples, the first sealing member is axially located between a distal axial end of the spin-on fluid cartridge and an end of the inwardly facing threads most remote from the distal axial end. In some examples, the distal axial end is defined by a second sealing member surrounding the plurality of inlet orifices.

In one example, a spin-on fluid cartridge is provided that has a housing defining a plurality of inlet orifices surrounding a threaded outlet with inwardly facing threads, and that has a filter medium disposed within the housing. In one aspect, the fluid cartridge can include an extension tube including a first sealing member, the first sealing member being at least partially disposed within and spaced from the threaded outlet.

In some examples, the housing further defines a main body and a baffle plate secured to the main body, wherein the baffle plate includes the plurality of inlet orifices and threaded outlet.

In some examples, a first end cap adjoining an end of the filter medium is provided, wherein the extension tube is integrally formed with the first end cap. In some examples, the first end cap adjoins an end of the filter medium and an outlet part is connected to the first end cap, wherein the extension tube is formed by a portion of the outlet part.

In some examples, a second seal member for sealing the housing to a filter head is provided wherein the second seal member surrounds the plurality of inlet orifices and having an axially facing seal surface.

In some examples, the first sealing member defines an outwardly directed radial seal surface. In some examples, the first sealing member is disposed at an oblique angle to a longitudinal axis of the filter cartridge. In some examples, the first sealing member has a frustoconical shape. In some examples, the first sealing member is integrally formed with the extension tube. In some examples, the first sealing member has an axial and a radial component. In some examples, the first sealing member is formed separately from the extension tube. In some examples, the first sealing member is an O-ring.

In some examples, the extension tube is formed from a plastic material. In some examples, the extension tube is formed from a metal material. The technical effects and advantages of embodiments of the system and the kit according to the present disclosure correspond, mutatis mutandis, to those of the corresponding embodiments of the spin-on fluid treatment device according to the present disclosure.

BRIEF DESCRIPTION OF THE FIGURES

These and other features and advantages of embodiments of the present disclosure will now be described in more detail with reference to the attached drawings, in which.

Throughout the figures, the same numerals are used to refer to the same or functionally similar elements.

DETAILED DESCRIPTION

Figure 1:
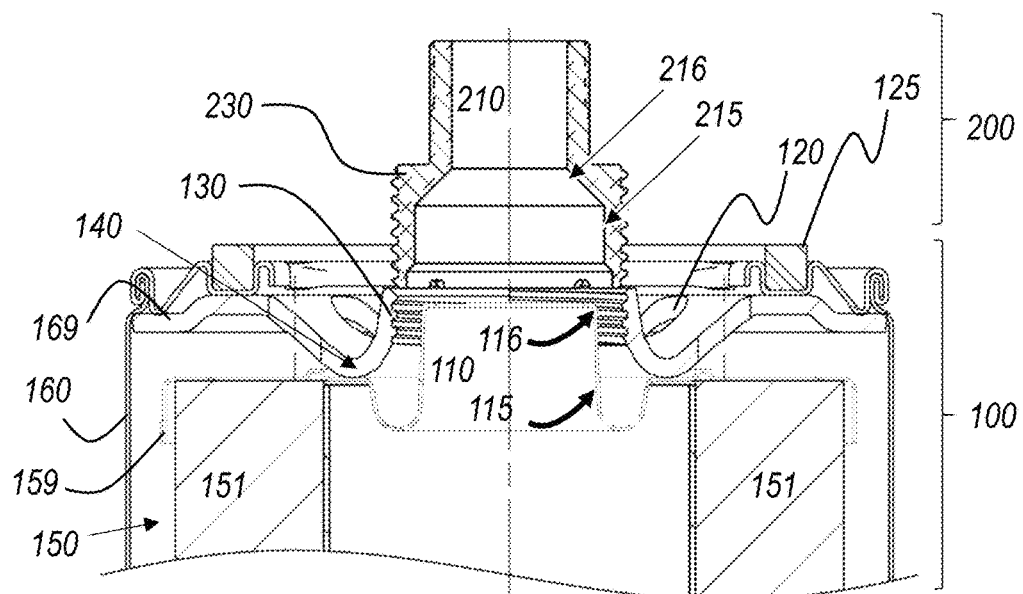
FIGS. 1-3 illustrate the top portion of a first embodiment of the spin-on fluid treatment device according to the present disclosure.

The disclosure pertains to a spin-on fluid treatment device, such as for example a spin-on filter, a catalyst, an air-oil separator, or a canister, for use with internal combustion engines, hydraulic machines, and other machines. The device comprises a substantially cylindrical housing with a top surface, which presents the orifices for interfacing with the machine. The term "top surface" is used to designate the flat top of the fluid treatment device which rests against a corresponding surface of the machine when the spin-on fluid treatment device is installed. Throughout the application, the terms "up" and "down", or "top" and "bottom", are used in accordance with the aforementioned definition of "top surface", notwithstanding the fact that certain applications may use the device in a different orientation.

The top surface has a centrally arranged internally threaded bore, which contains the outlet orifice as described in more detail below. The top surface further presents at least one inlet orifice radially removed from the threaded bore, and an axial seal surrounding the at least one inlet orifice, to ensure that fluids directed into the inlet orifice do not flow away along the side of the top surface. The axial seal may be provided close to the circumference of the top surface, and it will abut and be compressed against the corresponding surface of the machine when the threaded bore is screwed sufficiently far onto the attachment head of the machine. By use of the term "axial seal" it is meant to include seal surfaces that face in a direction orthogonal to the longitudinal axis of the filter cartridge such that a seal can be formed by movement of the filter cartridge in the axial direction (i.e. a direction parallel to the longitudinal axis).

An outlet tube is at least partially disposed inside said threaded bore in a concentric position—the open end of the tube may be flush with the top surface, it may be sunk in relative to the top surface, or it may stick out from the top surface. The outlet tube is in fluid communication with the inside of the housing; in particular, in the case of a filter device or a catalyst, it is in fluid communication with the "clean side" of the device; without loss of generality, reference will be made to the "clean side" of the device hereinafter, when designating the portion of the device that is in fluid communication with the outlet tube. The ring-shaped space that lies inside the bore between the outlet tube and the threaded surface will receive the threaded counterpart provided on the inlet of the machine.

The treatment medium is arranged inside the housing to treat fluids entering through the at least one inlet orifice and leaving through the outlet tube.

The present disclosure is based inter alia on the insight of the inventor that the threaded bore and the threaded counterpart on the machine are prone to attracting or even causing impurities during handling, shipping, and servicing, and must therefore be sealed off from the clean side in an adequate manner.

The present disclosure achieves this sealing by providing in the fluid treatment device an additional outlet tube, concentric with the threaded bore, which is provided with a sealing portion. The sealing portion is externally oriented (i.e., it is facing outwardly or upwardly relative to the outlet tube) and is configured for engaging with a complementary element of an inlet orifice of the entity that receives said treated fluids. Said inlet orifice thus includes a cylinder with an outer thread onto which the fluid treatment device can be screwed, and with an inwardly directed inner sealing surface. Said cylinder is also referred to as a "snout" in the present disclosure.

The sealing portion, which is preferably disposed in close proximity to the threaded bore, may be a sealing surface or a sealing arrangement configured for engaging with a complementary surface of the inlet orifice of an entity that receives said treated fluids.

Preferably, the sealing portion is located between the bottom end of the thread provided on the outlet tube and the top surface of the spin-on device. When installed, the sealing portion is preferably situated in the volume above the lower end of the complementary threaded surface of the machine.

The presence of the seals and threads thus defines two sealed interfaces:

The inlet interface is achieved by the at least one inlet orifice, radially removed from the threaded bore, which is sealed peripherally by the axial seal surrounding the at least one inlet orifice and centrally by the interlocking threaded surfaces.

The outlet interface is achieved by the outlet tube, which is sealed peripherally by the sealing surface facing outwardly and/or upwardly, which engages with the corresponding surface of the inlet orifice of the entity that receives the treated fluids.

To further ensure the cleanliness of the outlet interface, the outlet interface is preferably protected by a cap when the fluid treatment device is not in use, including prior to its first use. The cap preferably engages in a sealing manner with the externally oriented sealing portion of the outlet tube (described below).

Figure 2:
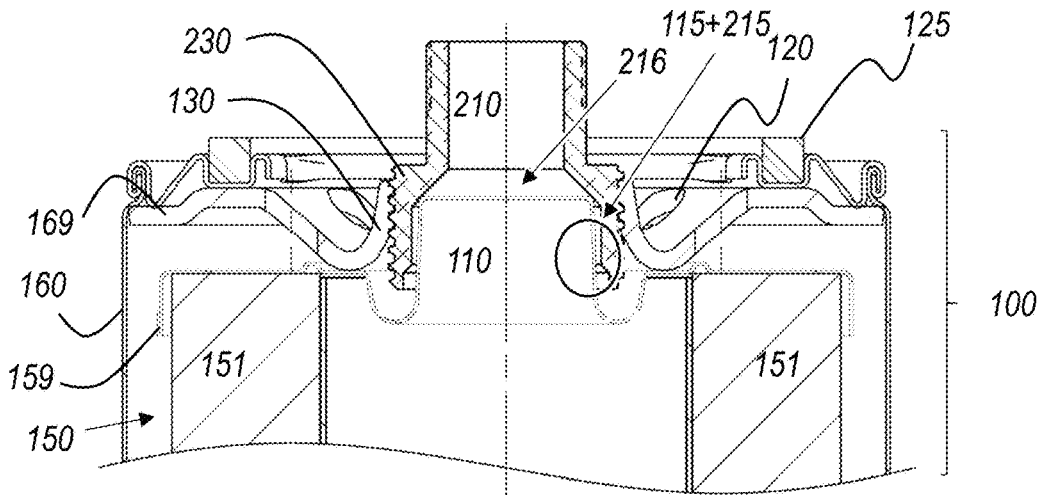
Figure 3:
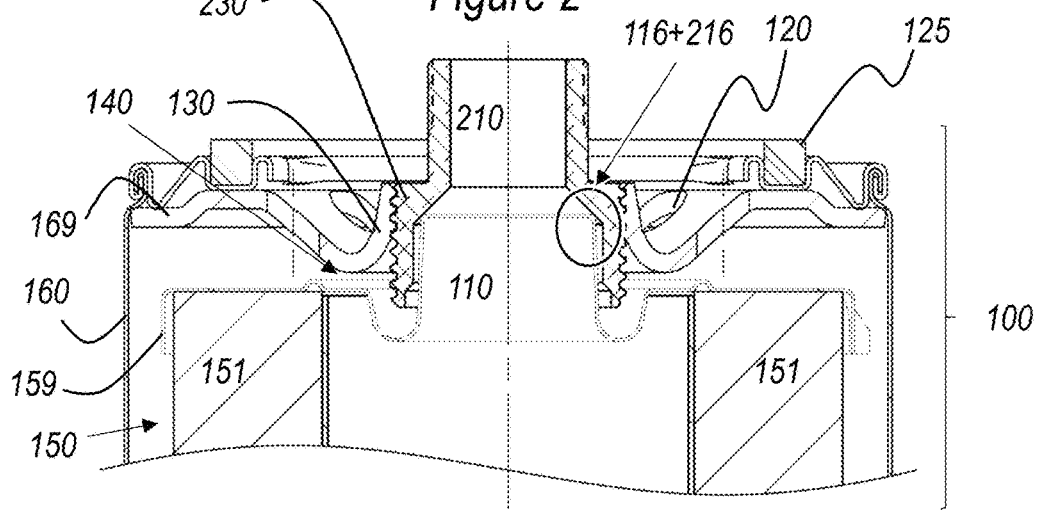

FIGS. 1-3 illustrate the top portion (including a top surface formed by a baffle plate or cover piece 169 seamed onto a main body 160) of a first embodiment of the spin-on fluid filter cartridge or treatment device 100 according to the present disclosure, in cross-section, in consecutive stages of engagement. Without loss of generality, the spin-on fluid treatment device 100 is illustrated as a filter device containing a filter cartridge 150; any references to a filter cartridge are not intended to limit the present disclosure to that application. The treatment device 100 removably attaches to a filter head 200 (only partially illustrated in FIGS. 1-3), as further explained below. The filter head 200 has a spud forming an inlet tube 210. The inlet tube 210 has an outer surface with external threads 230, and an inner surface 215/216. The inner surface 215/216 forms a sealing surface for sealing with the treatment device 100, explained below.

The outlet tube 110 is formed as a substantially cylindrical tube, preferably made of metal, the wall 115 of which is, in the embodiment of FIGS. 1-3, rounded at the open top end 116.

The inlet orifices 120 are disposed around the threaded bore 130, and are in fluid communication with the "dirty side" of the device interior. This inlet zone is sealed off peripherally by an axial seal 125.

The cover piece 169 further includes an inwardly angled section extending from the planar portion to a depressed portion 140. The depressed portion 140, in this embodiment, is adjacent to the central bore 130.

In the illustrated embodiment, the inlet orifices 120 are disposed in the inwardly angled section, which ends in the depressed portion 140 of the top surface. At the inside of the housing, the filter element containing the treatment medium (e.g., filter media 151 rests against this depressed portion 140, under the action of a resilient element (not illustrated) exerting an upward force (with reference to the elements identified in FIG. 19, the resilient element would typically be a spring disposed in the housing 160 between the bottom 165 of the housing 160 and the bottom surface or end cap 155 of the filter element 150).

In FIG. 1, the threaded bore 130 is not engaged with the threaded outer surface 230 of the machine's inlet tube 210.

In FIG. 2, the threaded bore 130 is partially engaged with the threaded outer surface 230 of the machine's inlet tube 210. The wall 115 of the substantially cylindrical tube 110 may frictionally engage with the inner surface 215 of the machine's inlet tube 210, thus forming an initial radial seal 115+215. By use of the term "radial seal" it is meant to include seal surfaces extending in a direction(s) that is parallel to the longitudinal axis of the filter cartridge (e.g. a surface extending along a cylindrical surface axially aligned with the longitudinal axis). In the example shown, the radial seal is an outwardly directed radial seal. By use of the term "outwardly directed" it is meant to include seal surfaces that face away from the longitudinal axis of the filter cartridge. Alternatively, there may be some clearance between the wall 115 of the substantially cylindrical tube 110 and the inner surface 215 of the machine's inlet tube 210, in which case the seal is entirely formed by the surfaces 116 and 216 as described above.

In FIG. 3, the threaded bore 130 is fully engaged with the threaded outer surface 230 of the machine's inlet tube 210. The rounded top end 116 presses against a tapered (conical) portion 216 of the machine's inlet tube 210, thus forming a secure outwardly and/or upwardly oriented seal 116+216. The axial force required to obtain proper sealing, is provided by the aforementioned resilient element that exerts an upward force on the cartridge 150 containing the treatment medium 151. As can be seen in FIG. 3, at this level of engagement of the threaded surfaces, the end cap 159 of the filter element 150 is no longer in contact with the depression 140 of the cover piece 169 of the housing 160; thus, it is indeed the sealing surface 216 that counteracts the force of the resilient element, and not the depression 140 of the cover piece 169 of the housing 160.

In this embodiment, the sealing surface 216 is in an inwardly angled surface. It may have different shapes in other embodiments, as described below.

In this way, the clean side of the fluid treatment device 100 is completely sealed off from the thread area 130/230 that is most prone to containing impurities.

The outlet tube 110 and/or the machine's corresponding inlet tube 210 may be shaped so as to provide an automatic alignment of the respective axes during the engagement, eg preferably forming a first contact, eg preferably before the threads are engaging, for example by providing a tapered top portion (chamfer) of the outlet tube 110 and/or a corresponding internally tapered bottom portion of the inlet tube 210. This feature may for example absorb an initial misalignment of 1 mm or less, preferably 2 mm or less, and most preferably 3 mm or less. This feature may be provided on machine heads designed to receive spin-on elements, irrespectively of the other features of the inventions described herein.

Figure 4:
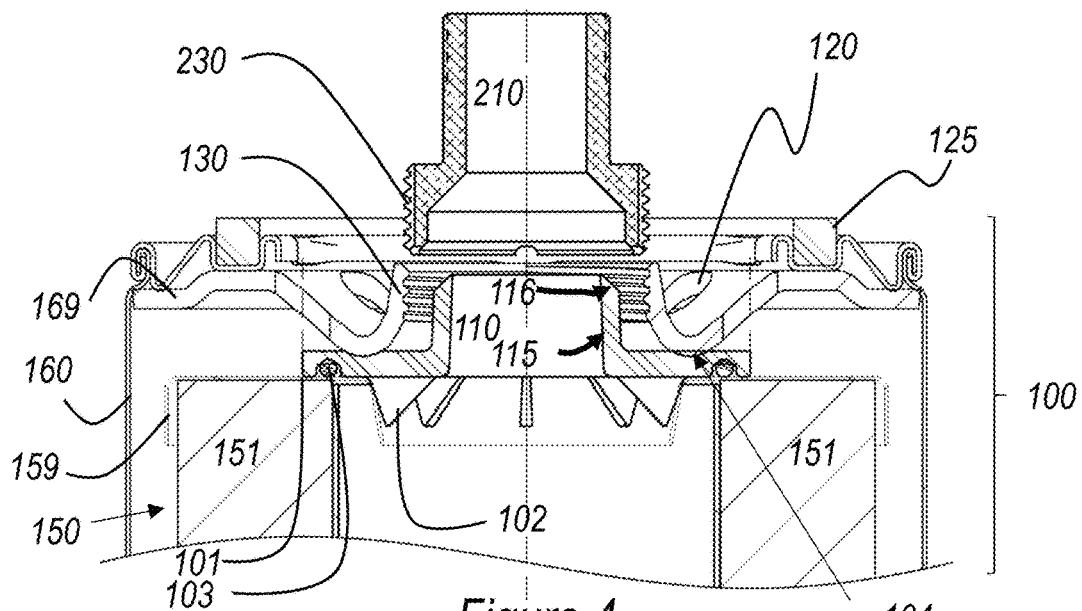
FIGS. 4-6 illustrate the top portion of a second embodiment of the spin-on fluid treatment device according to the present disclosure.
Figure 5:
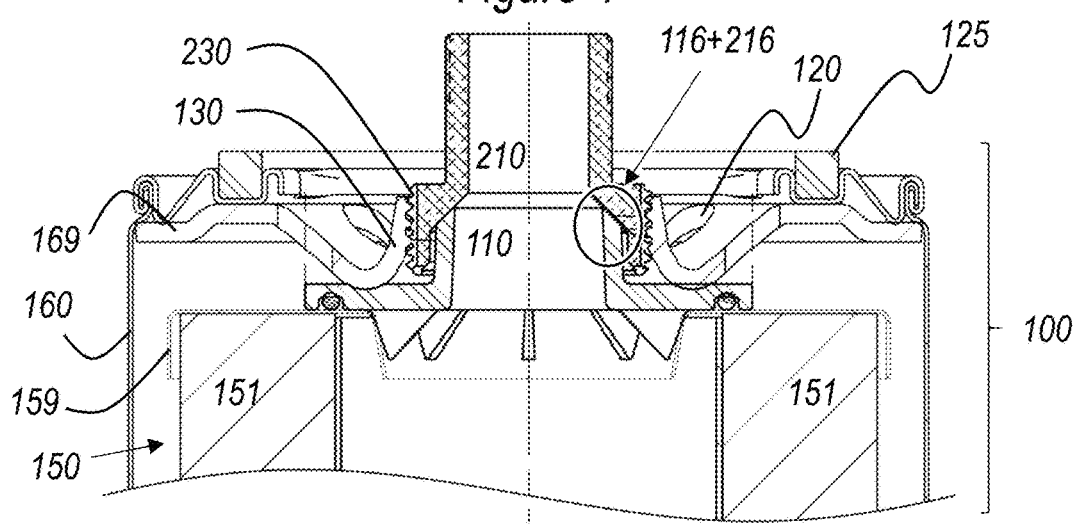
Figure 6:
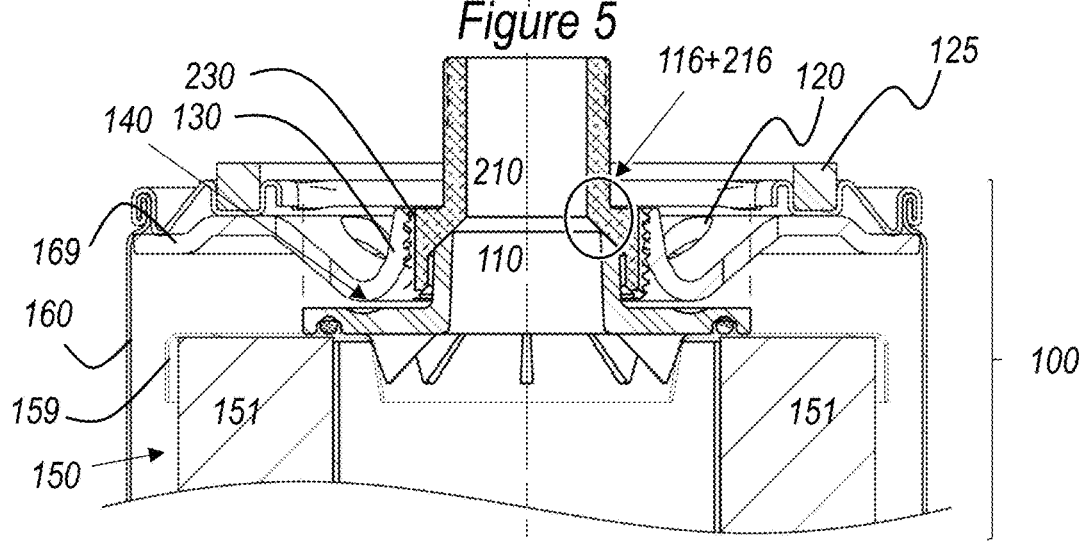

FIGS. 4-6 illustrate the top portion (including a top surface formed by a cover piece 169 seamed onto a main body 160) of a second embodiment of the spin-on fluid treatment device 100 according to the present disclosure, in cross-section, disengaged, partially engaged, and fully engaged, respectively.

The outlet tube 110 is formed as a substantially cylindrical tube, preferably made of plastic, the wall 115 of which is tapered at the open top end 116 so as to form a frustoconical surface.

A number of inlet orifices 120 are disposed around the threaded bore 130, and are in fluid communication with the "dirty side" of the device interior. This inlet zone is sealed off peripherally by an axial seal 125.

Figure 19:
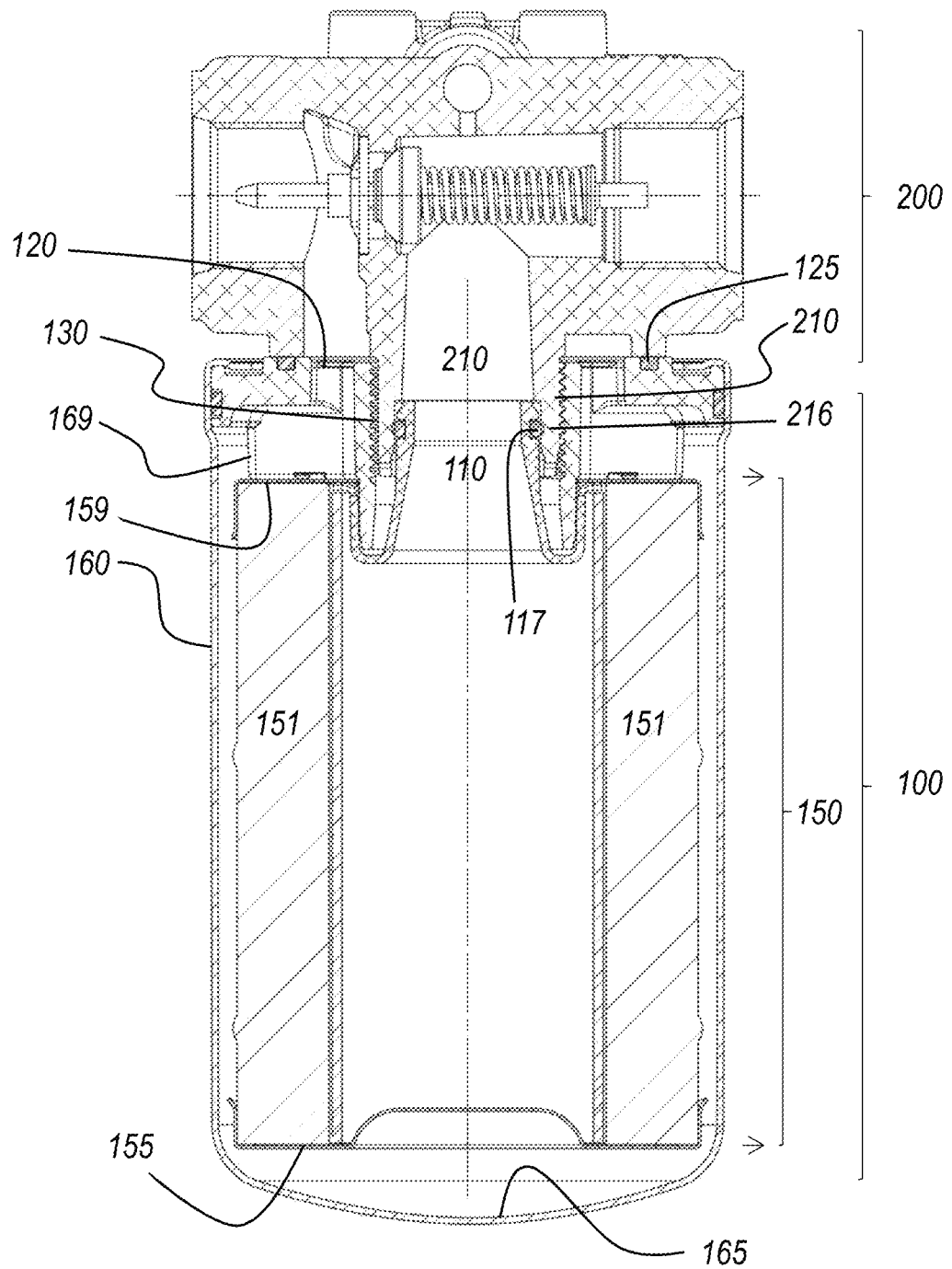
FIG. 19 is a schematic cross-sectional view showing one embodiment of a filter cartridge including a housing, end piece, and internal filter element.

As in the previously described embodiment, the filter element 150 containing the filter media 151 rests against this depressed portion 140 of the cover piece 169, under the action of a resilient element (not illustrated) exerting an upward force (with reference to the elements identified in FIG. 19, the resilient element would typically be a spring disposed in the housing 160 between the bottom 165 of the housing 160 and the bottom surface 155 of the cartridge 150).

In FIG. 4, the threaded bore 130 is not engaged with the threaded outer surface of the machine's inlet tube 210. The illustrated portion of the fluid treatment device 100 is composed of a standard metal end cap 159 and a molded plastic part 102 that includes the outlet tube 110. This way of adapting the can end necessitates an additional seal to separate the dirty side from the clean side; this additional seal may take the form of an O-ring 103.

To ensure proper alignment of the plastic part 102 relative to the cover piece 169 carrying the threaded bore 130, one or more centering grooves 104 may be provided on the plastic part 102 to cooperate with one or more corresponding downward protrusions of the cover piece 169.

In FIG. 5, the threaded bore 130 is partially engaged with the threaded outer surface 230 of the machine's inlet tube 210. The wall 115 of the substantially cylindrical tube 110 lies against the inner surface 215 of the machine's inlet tube 210. The tapered top end 116 contacts a correspondingly tapered (conical) portion 216 of the machine's inlet tube 210, thus forming an initial seal 116+216 having an axial and a radial component. In one aspect, the tapered top end 116 can be characterized as defining an oblique sealing surface in which the end of the top end 116 is aligned at an non-orthogonal angle to the longitudinal axis of the filter cartridge 100. In the example shown, the oblique angle is about 42 degrees with respect to the longitudinal axis. Other angles are possible.

In FIG. 6, the threaded bore 130 is fully engaged with the threaded outer surface 230 of the machine's inlet tube 210. The tapered top end 116 presses against a correspondingly tapered (conical) portion 216 of the machine's inlet tube 210, thus forming a secure seal 116+216 having an axial and a radial component. The axial force required to obtain proper sealing, is provided by the aforementioned resilient element that exerts an upward force on the filter element 150. As can be seen in FIG. 6, at this level of engagement of the threaded surfaces, the end cap 159 is no longer in contact with the depressed portion 140 of the cover piece 169 of the housing 160; thus, it is indeed the sealing surface 216 that counteracts the force of the resilient element, and not the depression 140 of the cover piece 169.

In this way, the clean side of the fluid treatment device is completely sealed off from the thread area 130/230 that is most prone to containing impurities.

Figure 7:
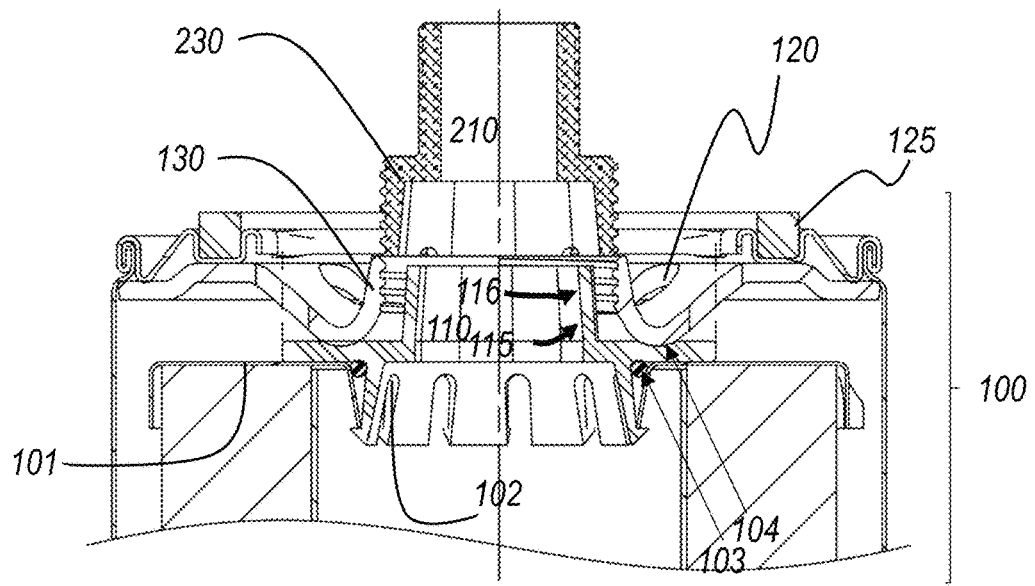
FIGS. 7-9 illustrate the top portion of a third embodiment of the spin-on fluid treatment device according to the present disclosure.
Figure 8:
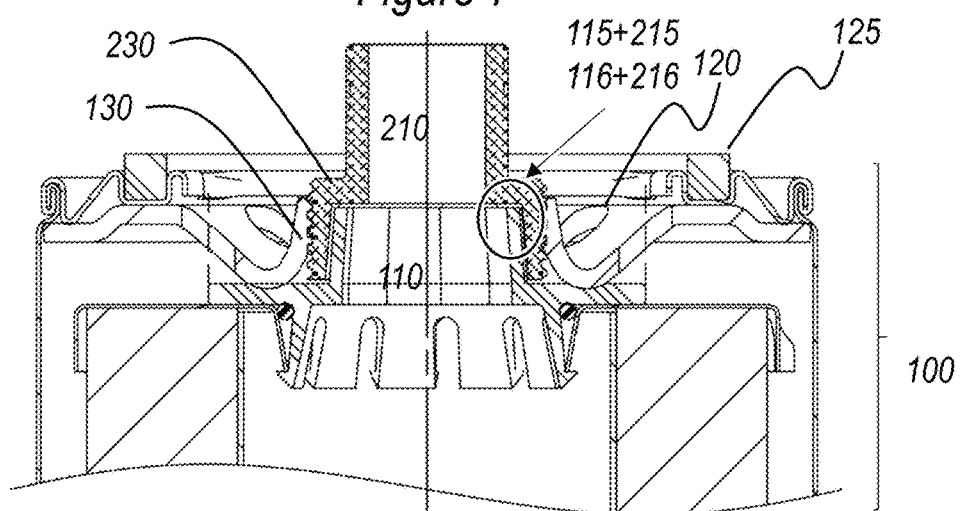
Figure 9:
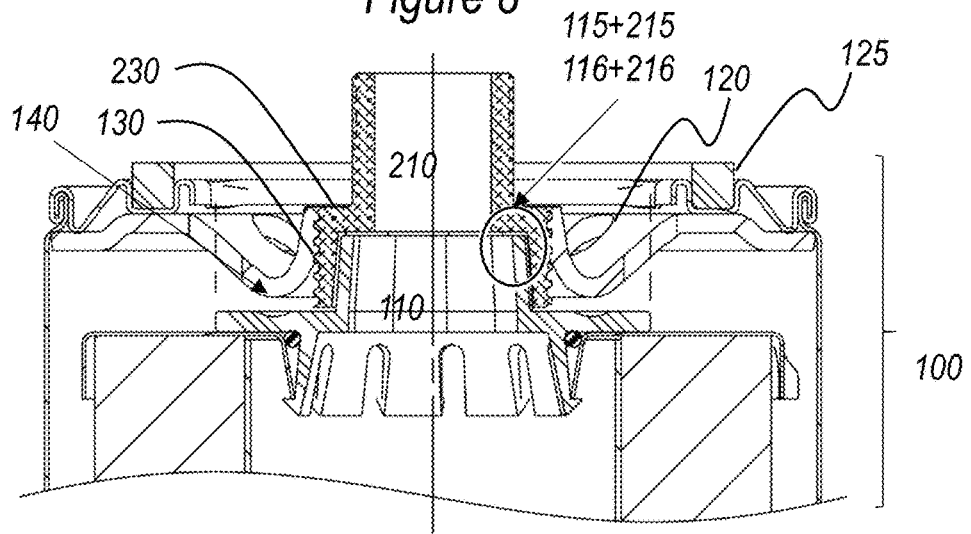

FIGS. 7-9 illustrate the top portion (including a top surface formed by a cover piece 169 seamed onto a main body 160) of a third embodiment of the spin-on fluid treatment device 100 according to the present disclosure, in cross-section, disengaged, partially engaged, and fully engaged, respectively.

The outlet tube 110 is formed as a frustoconical tube, preferably made of plastic.

A number of inlet orifices 120 are disposed around the threaded bore 130, and are in fluid communication with the "dirty side" of the device interior. This inlet zone is sealed off peripherally by an axial seal 125.

As in the previously described embodiment, the filter element 150 containing the filter media 151 rests against this depressed portion 140 of the cover piece 169, under the action of resilient element (not illustrated) exerting an upward force (with reference to the elements identified in FIG. 19, the resilient element would typically be a spring disposed in the housing 160 between the bottom 165 of the housing 160 and the bottom surface 155 of the filter element 150).

In FIG. 7, the threaded bore 130 is not engaged with the threaded outer surface of the machine's inlet tube 210. The illustrated portion of the fluid treatment device 100 is composed of an end cap 159, with an angle to accommodate an O-ring 103, and a part 102 that includes the outlet tube, which is attached to the end cap 159 by means of a snap-fit connection. This way of adapting the can end necessitates an additional seal to separate the dirty side from the clean side; this additional seal may take the form of an O-ring 103.

To ensure proper alignment of the plastic part 102 relative to the cover piece 169 carrying the threaded bore 130, one or more centering grooves 104 may be provided on the plastic part 102 to cooperate with one or more corresponding downward protrusions of the cover piece 169. Instead of the centering grooves 104, other appropriate means may be provided that act to bring the plastic part 102 into alignment with the cover piece 169.

In FIG. 8, the threaded bore 130 is partially engaged with the threaded outer surface 230 of the machine's inlet tube 210. The slanted wall 115 of the frustoconical tube lies against the correspondingly slanted inner surface 215 of the machine's inlet tube 210, and the top edge 116 of the frustoconical tube 110 lies against a corresponding surface 216 of the inlet tube 210, thus forming an initial seal 115+215/116+216 having an axial and a radial component.

In FIG. 9, the threaded bore 130 is fully engaged with the threaded outer surface 230 of the machine's inlet tube 210. The slanted wall 115 of the frustoconical tube lies against the correspondingly slanted inner surface 215 of the machine's inlet tube 210, and the top edge 116 of the frustoconical tube 110 presses against a corresponding surface 216 of the inlet tube 210, thus forming a secure seal 115+215/116+216 having an axial and a radial component. The axial force required to obtain proper sealing, is provided by the aforementioned resilient element that exerts an upward force on the cartridge 150 containing the treatment medium 151. As can be seen in FIG. 9, at this level of engagement of the threaded surfaces, the end cap 159 of the filter element 150 is no longer in contact with the depression 140 of the cover piece 169 of the housing 160; thus, it is indeed the sealing surface 216 that counteracts the force of the resilient element, and not the depression 140 of the cover piece 169 of the housing 160.

In this way, the clean side of the fluid treatment device 100 is completely sealed off from the thread area 130/230 that is most prone to containing impurities.

In this embodiment, the sealing surface 216 is in a planar surface at a right angle to a remaining portion of the internal surface 215 of the spud or inlet tube 210.

FIGS. 10-13 illustrate the top portion (including a top surface seamed onto a main body) of a fourth embodiment of the spin-on fluid treatment device 100 according to the present disclosure, in cross-section, in consecutive stages of engagement.

The outlet tube 110 is formed as a substantially cylindrical tube, preferably made of plastic. On the outside of the mantle of the cylinder, a groove is provided, which accommodates an O-ring 117.

A number of inlet orifices 120 are disposed around the threaded bore 130, and are in fluid communication with the "dirty side" of the device interior. This inlet zone is sealed off peripherally by an axial seal 125.

As in the previously described embodiment, filter element 150 containing the filter media 151 is pressed against this depressed portion 140 of the cover piece 169, under the action of resilient element (not illustrated) exerting an upward force (with reference to the elements identified in FIG. 19, the resilient element would typically be a spring disposed in the housing 160 between the bottom 165 of the housing 160 and the bottom surface 155 of the filter element 150).

Figure 10:
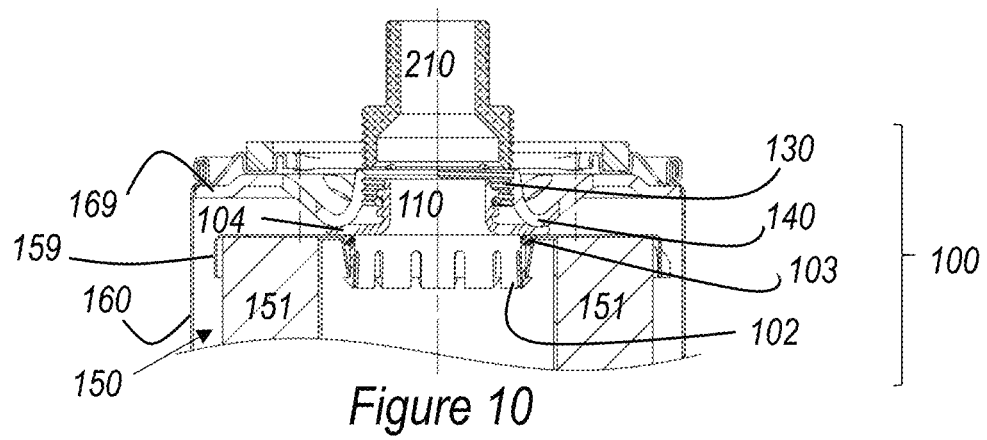
FIGS. 10-13 illustrate the top portion of a fourth embodiment of the spin-on fluid treatment device according to the present disclosure.

In FIG. 10, the threaded bore 130 is not engaged with the threaded outer surface of the machine's inlet tube 210. The illustrated portion of the fluid treatment device 100 is composed of an end cap 159, with an angle to accommodate an O-ring 103, and a part 102 that includes the outlet tube, which is attached to the end cap 159 by means of a snap-fit connection. This way of adapting the end cap necessitates an additional seal to separate the dirty side from the clean side; this additional seal may take the form of an O-ring 103.

To ensure proper alignment of the plastic part 102 relative to the top surface carrying the threaded bore 130, one or more centering grooves 104 may be provided on the plastic part 102 to cooperate with one or more corresponding downward protrusions of the top surface.

Figure 11:
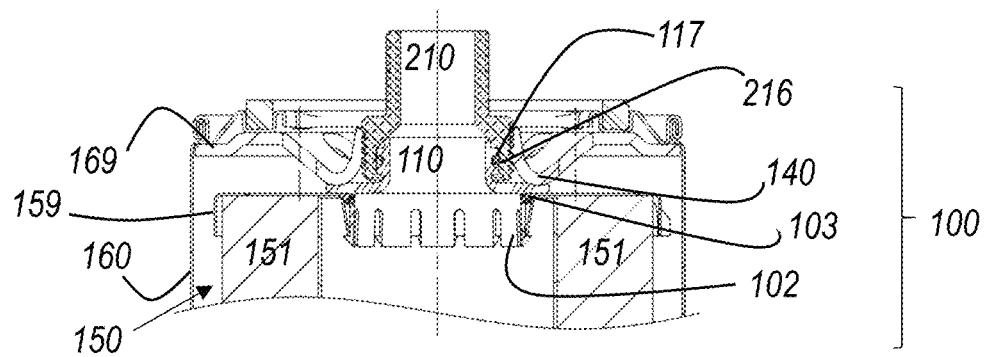

In FIG. 11, the threaded bore 130 is partially engaged with the threaded outer surface 230 of the machine's inlet tube

210. The O-ring 117 of the cylindrical tube pushes radially against the inner surface 215 of the machine's inlet tube 210, thus forming an initial radial seal 117+216.

Figure 12:
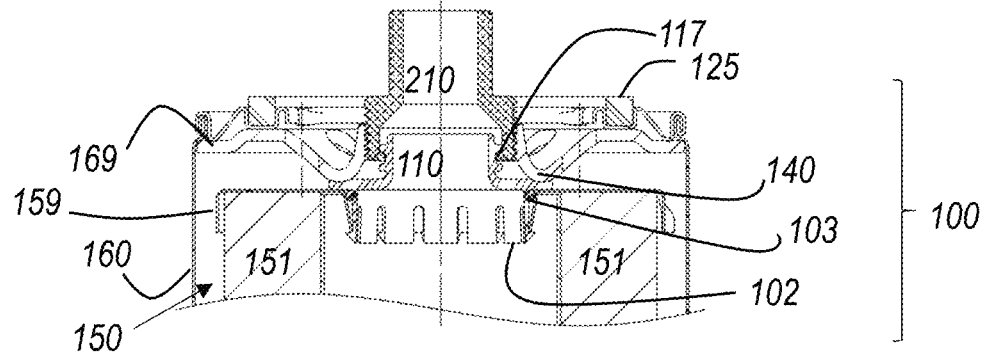

In FIG. 12, the threaded bore 130 is further engaged with the threaded outer surface 230 of the machine's inlet tube 210, to the point where the bottom of the machine's inlet tube 210 abuts the shoulder of the part 102 that includes the outlet tube. Any further engagement of the threaded surfaces (i.e., further rotations of the spin-on device, which should be continued up to the point where the axial seal 125 is sufficiently compressed by its counteracting surface), will cause the bottom of the machine's inlet tube 210 to push down on the filter element 150.

Figure 13:
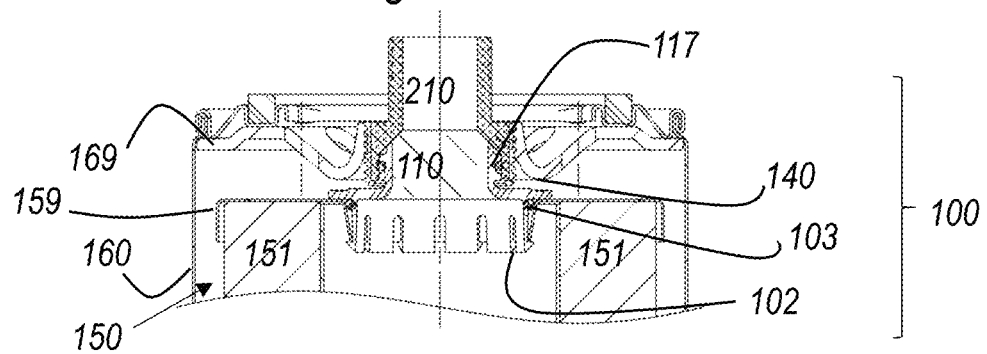

In FIG. 13, the threaded bore 130 is fully engaged with the threaded outer surface 230 of the machine's inlet tube 210. The O-ring 117 of the cylindrical tube continues to push radially against the inner surface 215 of the machine's inlet tube 210, thus forming a secure radial seal 117+216. In this way, the clean side of the fluid treatment device is completely sealed off from the thread area 130/230 that is most prone to containing impurities. At this level of engagement of the threaded surfaces, the top of the cartridge 150 is no longer in contact with the depression 140 of the top surface of the housing; thus, it is now the bottom of the machine's inlet tube 210 that counteracts the force of the resilient element, and not the depression 140 of the top surface of the housing.

Figure 14:
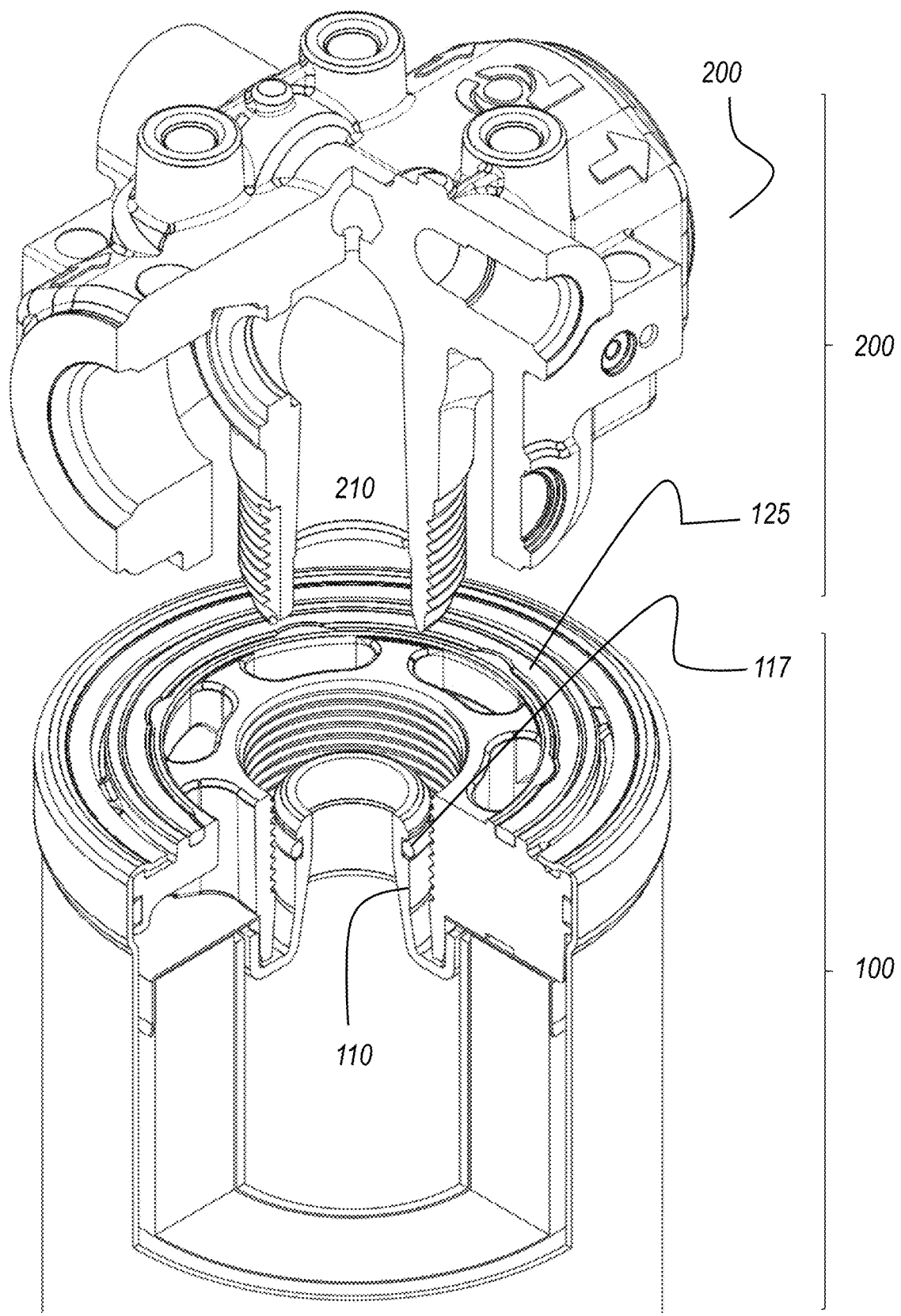
FIGS. 14 and 15 are a partially cut-out perspective drawings of the top portion of a fifth embodiment of the spin-on fluid treatment device according to the present disclosure.
Figure 15:
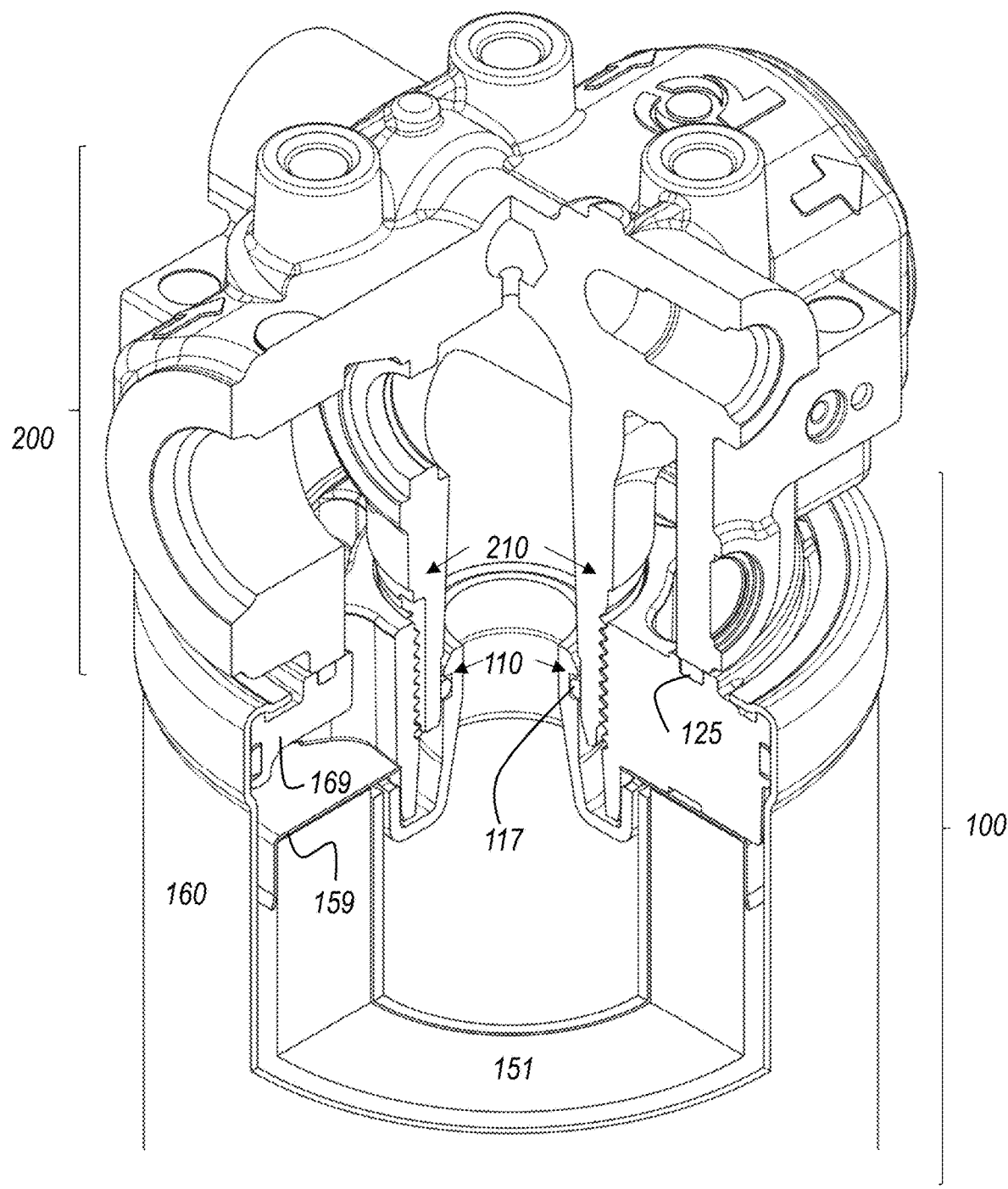

FIGS. 14 and 15 are a partially cut-out perspective drawings of the top portion of a fifth embodiment of the spin-on assembly 100 according to the present disclosure, of a type that is known in the trade as "Duramax". The spin-on fluid treatment device 100 is shown removed from the filter head 200, having spud or inlet tube 210.

The outlet tube 110 is formed as a substantially cylindrical tube, preferably made of metal. On the outside of the mantle of the cylinder, a groove is provided, which accommodates an O-ring 117.

A number of inlet orifices 120 are disposed around the threaded bore 130, and are in fluid communication with the "dirty side" of the device interior. This inlet zone is sealed off peripherally by an axial seal 125.

In FIG. 14, the threaded bore 130 is not engaged with the threaded outer surface 230 of the machine's inlet tube 210.

In FIG. 15, the threaded bore 130 is engaged with the threaded outer surface 230 of the machine's inlet tube 210, to the point where the axial seal 125 is compressed by the counteracting surface of the machine head. The O-ring 117 of the cylindrical tube pushes radially against the inner surface 216 of the machine's inlet tube 210, thus forming a secure radial seal 117+216. In this way, the clean side of the fluid treatment device is completely sealed off from the thread area 130/230 that is most prone to containing impurities.

The present disclosure also pertains to a system comprising a machine having a treatment device head and a spin-on fluid treatment device; wherein said spin-on fluid treatment device comprises a substantially cylindrical housing with a top surface, said top surface having a centrally arranged internally threaded bore, at least one inlet orifice radially removed from said threaded bore, and an axial seal surrounding said at least one inlet orifice, a treatment medium being arranged inside said housing to treat fluids entering through said at least one inlet orifice and leaving through said outlet tube; wherein said treatment device head comprises at least one head outlet orifice configured to achieve fluid communication with the at least one inlet orifice of the spin-on treatment device and a head inlet orifice configured to achieve fluid communication with the outlet orifice of the spin-on treatment device, said head inlet orifice being provided in a snout with a threaded outer surface configured to engage with the threaded bore of the spin-on fluid treatment device; wherein an outlet tube is at least partially disposed inside said threaded bore in a concentric position; and wherein said outlet tube is provided with an externally oriented sealing portion, configured for engaging with a complementary element of the head inlet orifice.

Figure 16:
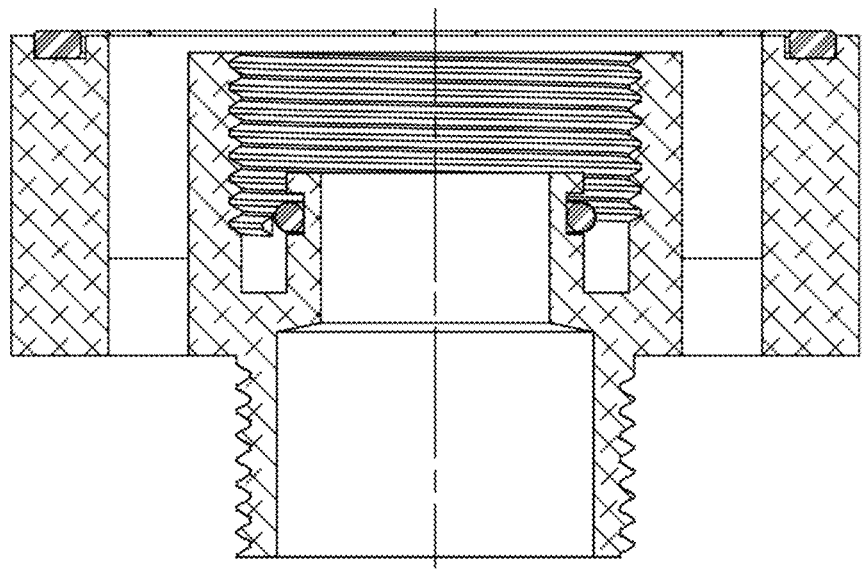
FIG. 16 illustrates an adapter that may be used to obtain a system according to the present disclosure based with a spin-on fluid treatment device of the known type.

The spin-on fluid treatment device used in embodiments of the system according to the present disclosure may be a spin-on fluid treatment device as described above with reference to FIGS. 1-15, but is not limited thereto. The system according to the present disclosure may also be obtained by equipping a machine head of the known type and a spin-of fluid treatment device of the known type with an appropriate adapter. A non-limiting example of such an adapter is illustrated in FIG. 16. The adapter may be semi-permanently installed on the machine head, or it may be supplied together with the spin-of fluid treatment device of the known type.

Figure 17:
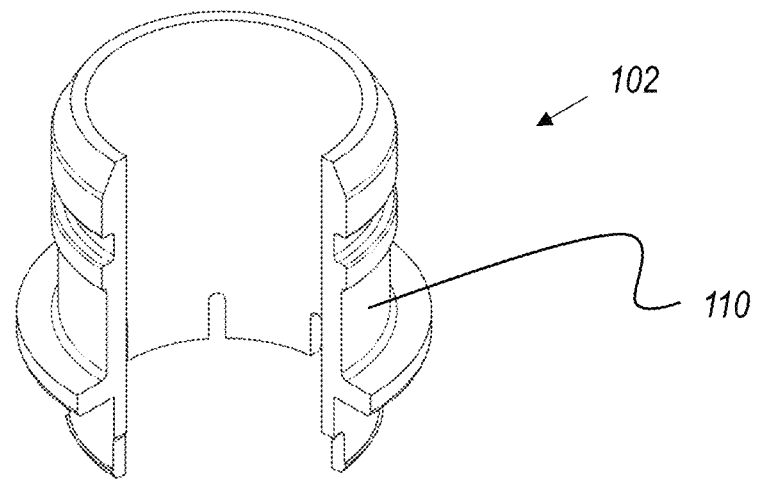
FIG. 17 illustrates a snap-fit part that may be provided as part of a kit to produce a spin-on fluid treatment device according to the present disclosure.

The present disclosure also pertains to a kit comprising a spin-on fluid treatment device of the known type, and a part to be installed within the threaded bore. The kit thus comprises a spin-on fluid treatment device comprising a substantially cylindrical housing with a top surface, said top surface having a centrally arranged internally threaded bore, at least one inlet orifice radially removed from said threaded bore, and an axial seal surrounding said at least one inlet orifice, a treatment medium being arranged inside said housing to treat fluids entering through said at least one inlet orifice and leaving through an outlet orifice; and a part 102 forming an outlet tube 110 with an externally oriented sealing portion, configured for engaging with a complementary element of the inlet orifice 210 of an entity that receives said treated fluids; wherein said part 102 is adapted to be installable onto said spin-on fluid treatment device such that said outlet tube 110 is at least partially disposed inside said threaded bore 130 in a concentric position and in sealed fluid communication with said outlet orifice. FIG. 17 provides a partially cut out perspective drawing of a snap-fit part 102 that may be provided as part of such a kit to produce a spin-on fluid treatment device according to the present disclosure by installing the part on spin-on fluid treatment device of the known type. For further details about the part 102, reference is made to the description of FIGS. 1-13.

Figure 18:
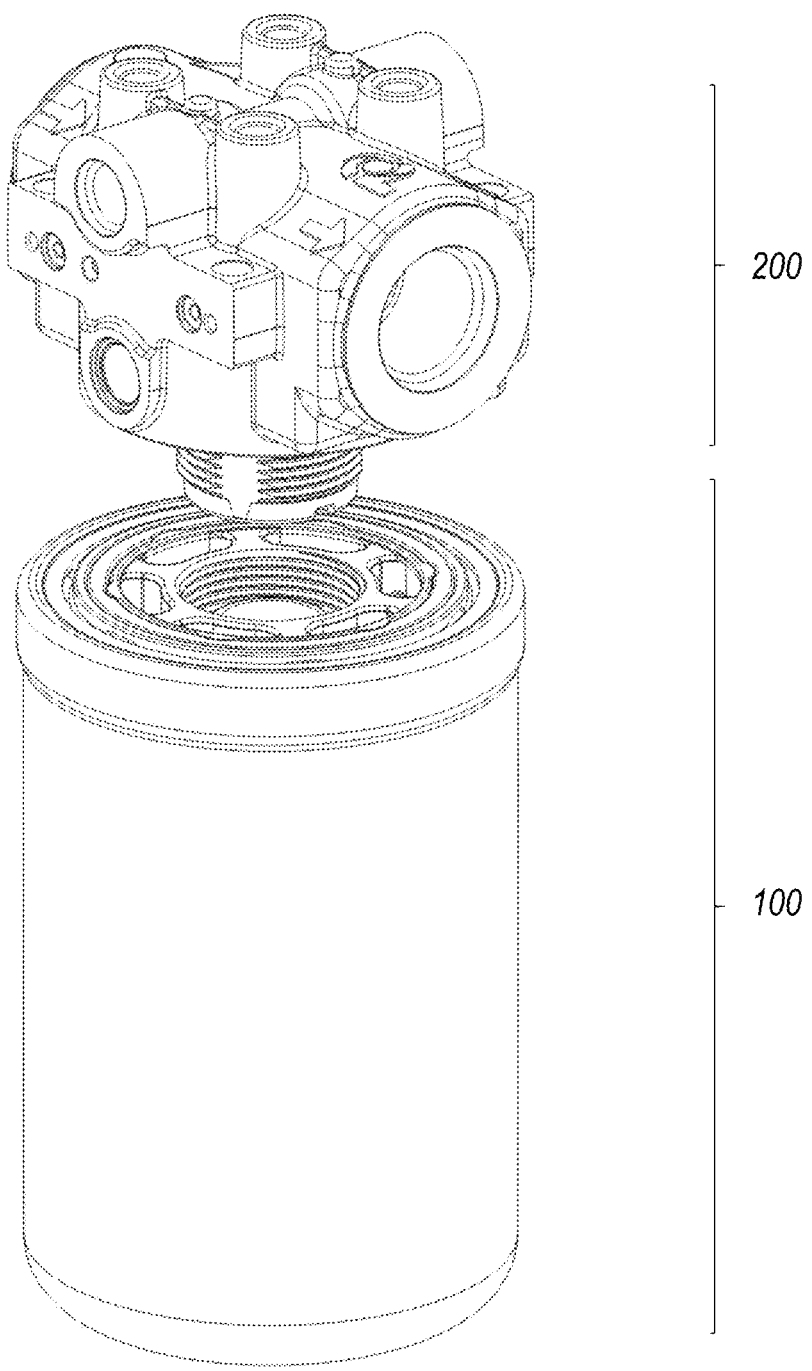
FIG. 18 is a schematic exploded perspective view of a filter assembly, including a filter head having an inlet tube or spud, and a filter cartridge.

FIG. 18 is a schematic exploded perspective view of a filter assembly, including a filter head 200 having an inlet tube or spud 210, and a filter cartridge 100. FIG. 19 is a corresponding schematic cross-sectional view, showing the filter cartridge 100 including a housing, end piece, and internal filter element.

In FIG. 19, the treatment device 100 includes a housing 160 with an outer wall. The outer wall is typically a thin metal wall, but it can be non-metal. The outer wall forms a housing surrounding wall and a closed bottom 165, which together surround an interior volume. At an end of the housing 160 opposite of the bottom 165 is a cover piece 169. The cover piece 169 covers the interior volume.

Many embodiments are possible. In the one shown, the cover piece 169 has a central bore 130, which is internally threaded. The central bore 130 is sized and configured to thread onto the externally threaded spud 210 of a filter head 200.

An inlet arrangement is radially spaced from the central bore 130. In the embodiment shown, the inlet arrangement includes a plurality of inlet orifices 120 surrounding the central bore 130. As can be seen, both the central bore 130 and the inlet orifices 120 are in fluid communication with the interior volume.

An axial seal member 125 is located on the cover piece 169 surrounding the inlet arrangement. The axial seal member 125 forms an axially directed seal with the filter head 200, when the treatment device 100 is operably connected to the filter head 200. The axial seal member 125 is supported by a planar portion of the cover piece 169.

Still in reference to FIG. 19, the treatment device 100 includes a filter element 150 oriented in the interior volume of the housing 160. The filter element 150 includes a tubular media pack 151 surrounding a clean fluid volume. Typically, the media pack 151 includes pleated media. The media pack 151 is secured to and extends between opposite end caps 155, 159.

The filter element 150 includes an outlet tube 110. The outlet tube 110 axially extends away from a remaining portion of the filter element 150. The outlet tube 110 can be either the same piece (i.e., "integral with") as cover piece 169 (see FIG. 2), or is can be removably secured to the cover piece 169 (see, e.g., FIGS. 5, 8, and 11). When removably secured to the cover piece 169, there is an additional seal member therebetween, as further described above, inter alia in the context of FIG. 4. The outlet tube 110 is in fluid communication with the clean fluid volume of the filter element 150. When operably connected to the filter head 200, the outlet tube 110 extends into the spud 210, whereby the outer surface 116 of the outlet tube 110 and/or a separately provided sealing element 117 (such as the illustrated O-ring) forms a seal between and against the outlet tube 110 and the sealing surface 216 of the spud 210. Although the top end of the outlet tube 110 is shown in FIG. 19 to abut a corresponding surface of the spud 210 in the fully connected position of the spin-on fluid treatment device, such an abutment is not necessary and does not necessarily form an axial seal, as the required sealing is accomplished by the radial engagement 116/216 or 117/216.

Figure 20:
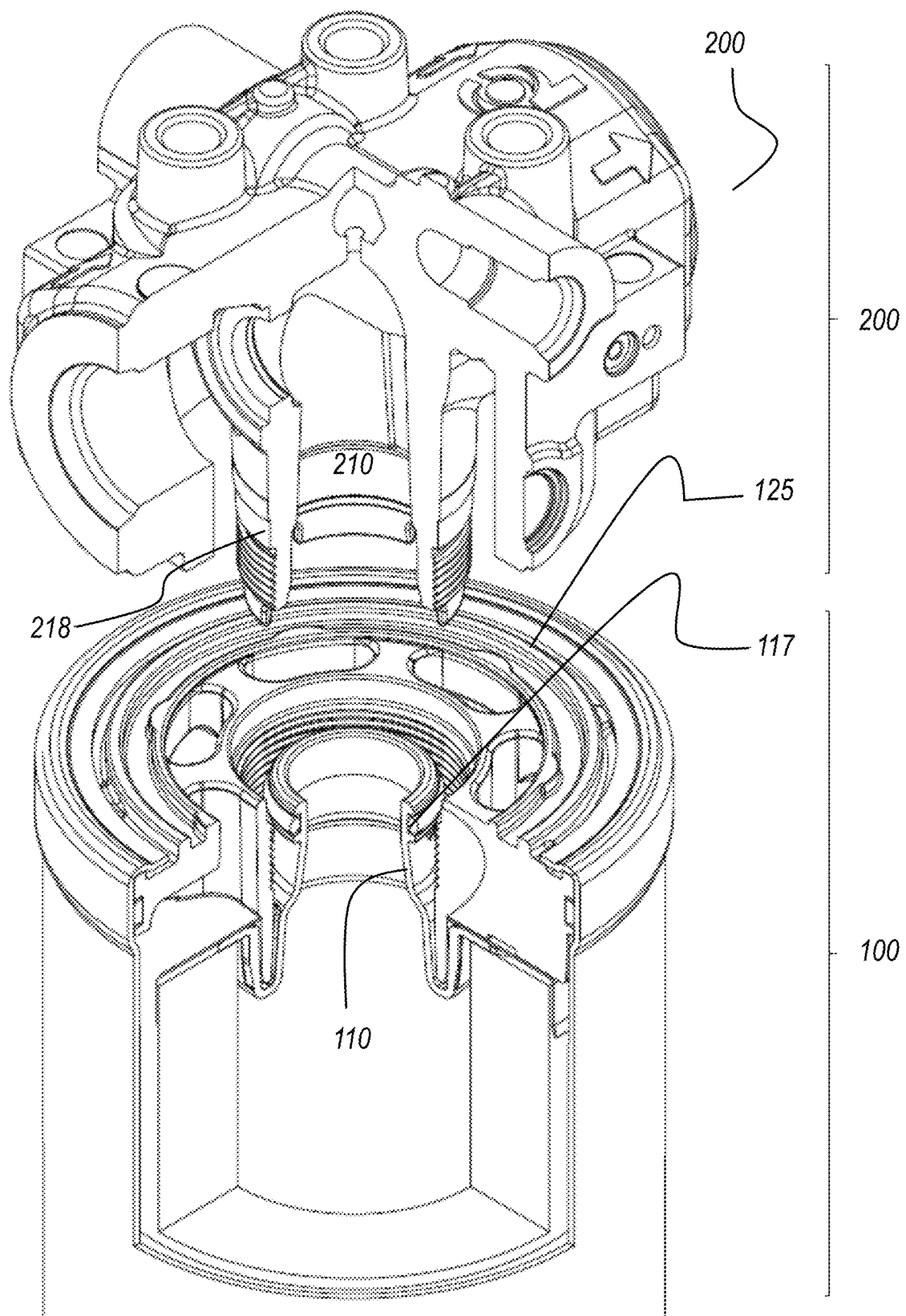
FIGS. 20 and 21 are a partially cut-out perspective drawings of the top portion of a sixth embodiment of the spin-on fluid treatment device according to the present disclosure.
Figure 21:
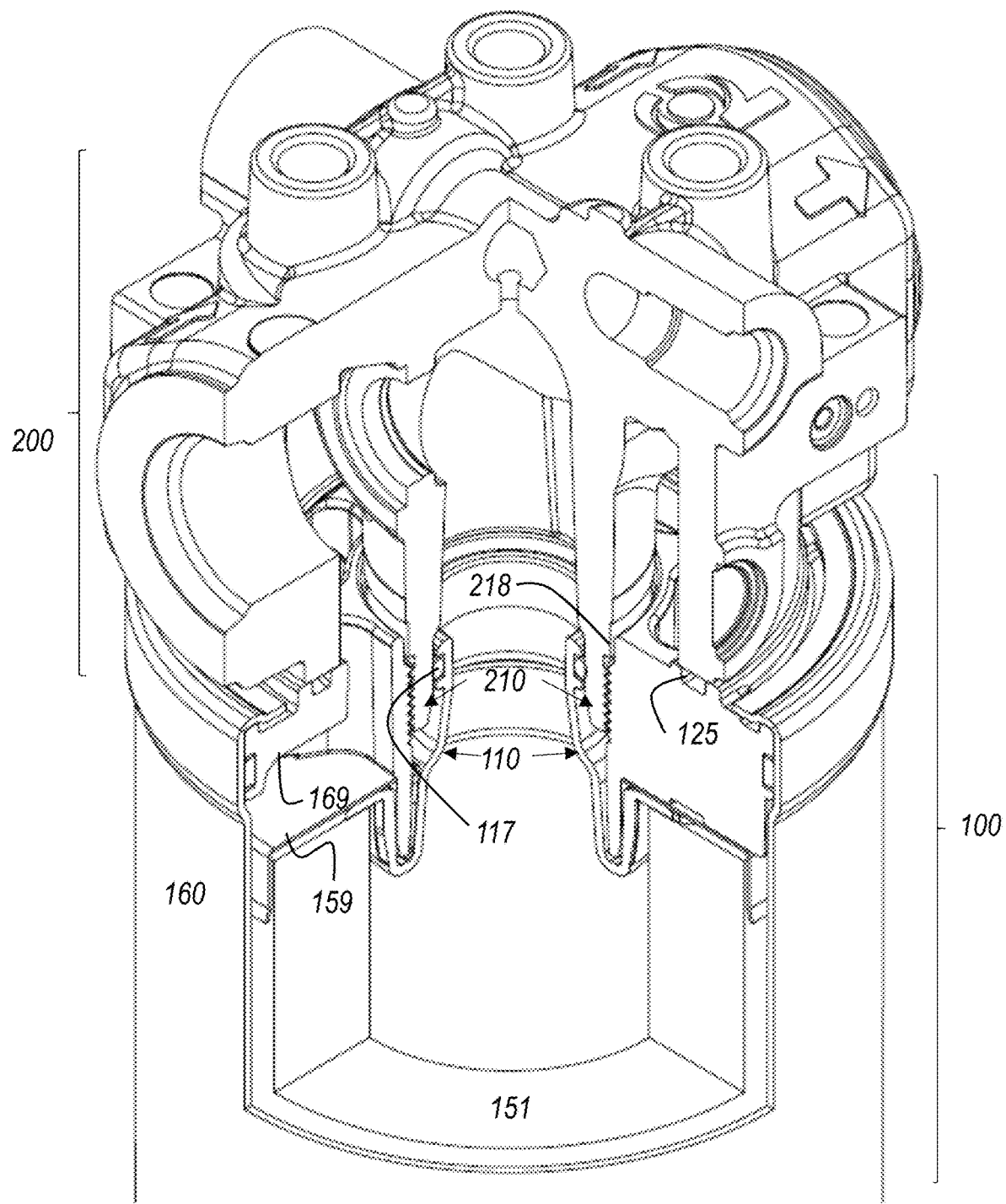

FIGS. 20 and 21 are a partially cut-out perspective drawings of the top portion of a sixth embodiment of the spin-on assembly 100 according to the present disclosure, a variant of the "Duramax" type. The spin-on fluid treatment device 100 is shown removed from the filter head 200, having spud or inlet tube 210.

The outlet tube 110 is formed as a substantially cylindrical tube, preferably made of metal. On the outside of the mantle of the cylinder, a groove is provided, which accommodates an O-ring 117.

A number of inlet orifices 120 are disposed around the threaded bore 130, and are in fluid communication with the "dirty side" of the device interior. This inlet zone is sealed off peripherally by an axial seal 125.

In FIG. 20, the threaded bore 130 is not engaged with the threaded outer surface 230 of the machine's inlet tube 210.

In FIG. 21, the threaded bore 130 is engaged with the threaded outer surface 230 of the machine's inlet tube 210, to the point where the axial seal 125 is compressed by the counteracting surface of the machine head. The O-ring 117 of the cylindrical tube pushes radially against the inner surface 216 of the machine's inlet tube 210, thus forming a secure radial seal 117+216. In this way, the clean side of the fluid treatment device is completely sealed off from the thread area 130/230 that is most prone to containing impurities.

Compared to the embodiment shown in FIGS. 14 and 15, the embodiment of FIGS. 20 and 21 has an axially shortened thread on the threaded bore 130, which makes the installation and removal of the spin-on fluid treatment device easier and faster. The thread on the threaded bore 130 does not reach all the way to the upper surface of the spin-on fluid treatment device (which carries the axial seal 125), thus leaving a portion of unthreaded surface. Upon installation of the spin-on fluid treatment device, this unthreaded surface slides over an element of the machine head that forms a shoulder or flange 218, which will be described in more detail below.

The inlet tube 210 of the spud shown in FIG. 21 is shaped so as to provide an automatic alignment of the respective outlet tube 110 during the engagement, by providing a tapered bottom portion of the inlet tube 210 which receives the tapered top portion (chamfer) of the outlet tube 110. In the illustrated case, this leads to a slightly narrower outlet tube 210 than in the embodiment shown in FIGS. 14 and 15. The inlet tube 210 of the spud shown in FIG. 21 is shaped with a shoulder or flange 218, which prevents screwing on any internally threaded element (such as the threaded bore 130) beyond the point at which the uppermost thread abuts the shoulder or flange 218. The element forming the shoulder or flange 218 may be cast in one piece with the head inlet tube 210, or it may be provided as a separate sleeve, for example a plastic sleeve, arranged around the head inlet tube 210 in a lasting manner. An appropriate design of the spin-on fluid treatment device, which duly takes into account the vertical position of the shoulder or flange 218, ensures that the spin-on fluid treatment device can be screwed onto the spud to the point where the threads are adequately engaged and both seal 117 and seal 125 are adequately compressed, before the upper thread of the threaded bore 130 reaches the shoulder or flange 218. However, a spin-on device that was not designed with the particular geometry of the spud (in particular the position of the shoulder or flange 218) in mind would, most likely, fail to install correctly; in this manner, the shoulder or flange 218 provides protection against the inadvertent installation of an incorrect spin-on device, the use of which might damage the equipment that relies on the functioning of a correct spin-on fluid treatment device. A radially outward facing portion of the element forming the shoulder or flange 218 may advantageously carry printed or engraved inscriptions indicating the type of spin-on fluid treatment device to be used, mounting instructions, manufacturer's indicia, and/or other information.

It is an advantage of embodiments of the present invention that the clean side of the spin-on fluid treatment device is sealed off, when installed, from the dirty side and the outside world by means of the externally oriented sealing portion 115, 116, thus removing reliance on the threaded coupling for sealing purposes. Accordingly, a threaded coupling with an axially reduced length can be used without detrimental effect to the quality of the seal. When, in addition, the outlet tube 110 is fully disposed inside the threaded bore 130, or emerges from it only to a small extent, the overall servicing height is reduced. This means that the vertical clearance required to be able to position the spin-on fluid treatment device underneath the filter head 200 in order to spin it on (or conversely, the vertical clearance required to be able to unscrew and remove the spin-on fluid treatment device), is less than would be the case in a traditional spin-on arrangement. This is an advantage in situations where the design of the equipment leaves only a limited amount of space for servicing clearance.

The fact that the present invention does not rely on a close contact between the blades of the threaded bore 130 and the threaded cylinder of the head inlet for sealing the clean side from the dirty side and the outside world, further opens up design options for the head inlet cylinder and the threaded bore 130 that would not otherwise be available. In embodiments of the present invention, the threaded elements are not circumferentially continuous. In particular, the threaded cylinder mantle of the machine inlet channel may have slits or grooves in the axial direction or other features which interrupt the threading pattern without affecting its ability to engage with an internally threaded element (in particular, the threaded bore 130). These features can be used to distinguish a particular angular position that may be relevant for the installation or operation of certain parts, or to impart other information to a user of the system. These features may further prevent or discourage the use of spin-on devices that are not according to the present invention, in particular of spin-on devices that are not equipped with an outlet tube 110 at least partially disposed inside the threaded bore 130 and provided with an externally oriented sealing portion 115, 116.

Figure 22:
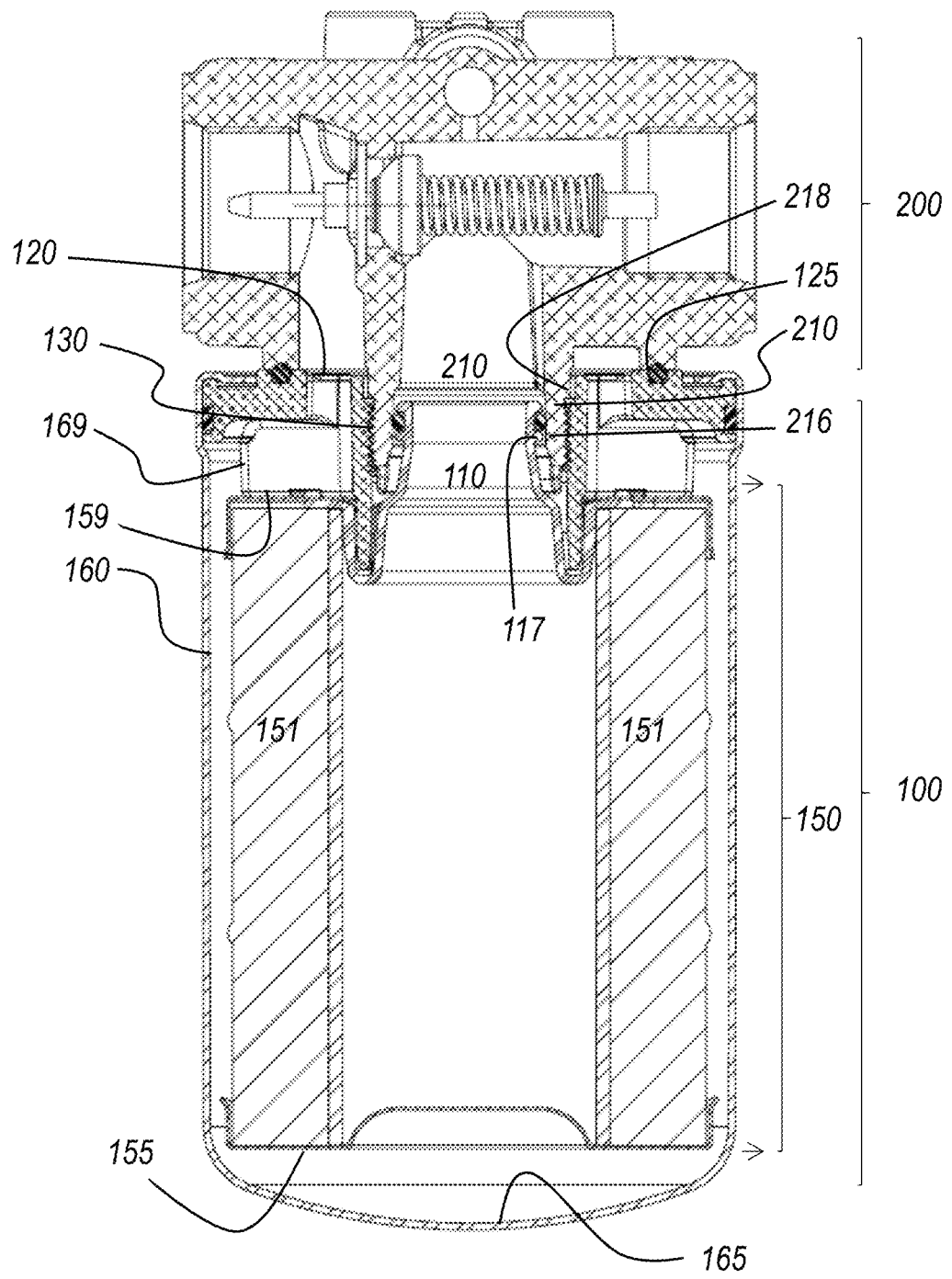
FIG. 22 is a schematic cross-sectional view showing one embodiment of a filter cartridge including a housing, end piece, and internal filter element.

In FIG. 22, the treatment device 100 includes a housing 160 with an outer wall. The outer wall is typically a thin metal wall, but it can be non-metal. The outer wall forms a housing surrounding wall and a closed bottom 165, which together surround an interior volume. At an end of the housing 160 opposite of the bottom 165 is a cover piece 169. The cover piece 169 covers the interior volume.

Many embodiments are possible. In the one shown, the cover piece 169 has a central bore 130, which is internally threaded. The central bore 130 is sized and configured to thread onto the externally threaded spud 210 of a filter head 200. The thread on the threaded bore 130 does not reach all the way to the upper surface of the spin-on fluid treatment device 100 (which carries the axial seal 125), thus leaving a portion of unthreaded surface. Upon installation of the spin-on fluid treatment device, this unthreaded surface slides over an element of the machine head that forms a shoulder or flange 218, as described above.

An inlet arrangement is radially spaced from the central bore 130. In the embodiment shown, the inlet arrangement includes a plurality of inlet orifices 120 surrounding the central bore 130. As can be seen, both the central bore 130 and the inlet orifices 120 are in fluid communication with the interior volume.

An axial seal member 125 is located on the cover piece 169 surrounding the inlet arrangement. The axial seal member 125 forms an axially directed seal with the filter head 200, when the treatment device 100 is operably connected to the filter head 200. The axial seal member 125 is supported by a planar portion of the cover piece 169.

Still in reference to FIG. 22, the treatment device 100 includes a filter element 150 oriented in the interior volume of the housing 160. Reference is made to the description of FIG. 19, above, for further details of the filter element 150 and its arrangement inside the treatment device 100.

Figure 23:
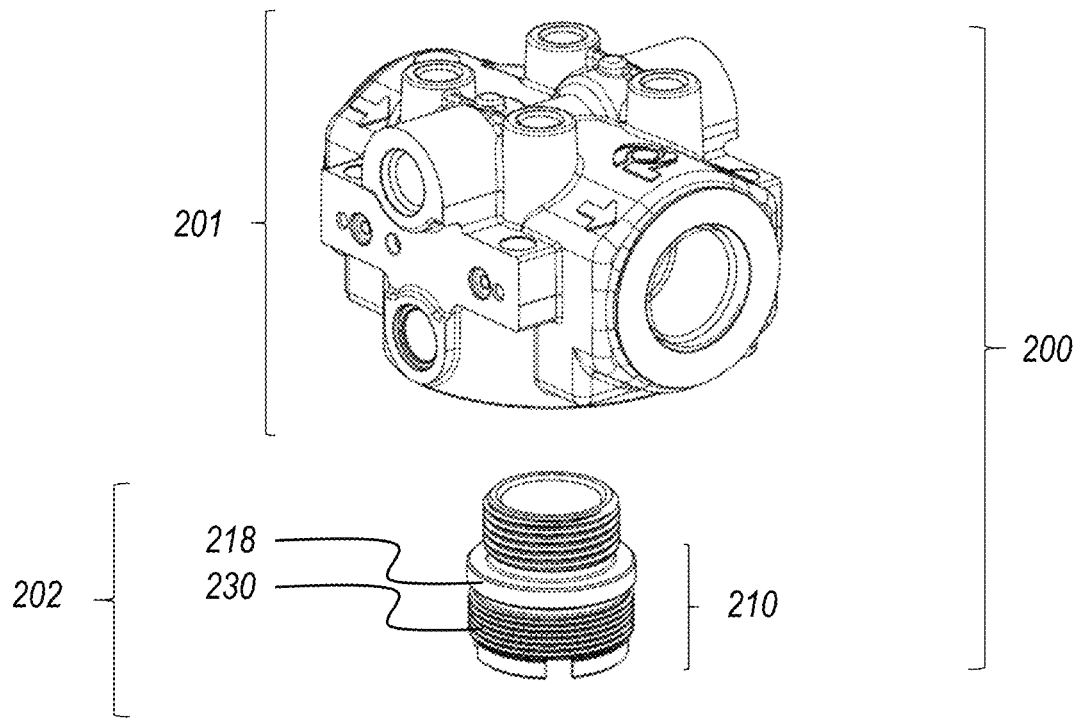
FIGS. 23-25 show how an existing machine head can be adapted for use in accordance with the present invention.
Figure 24:
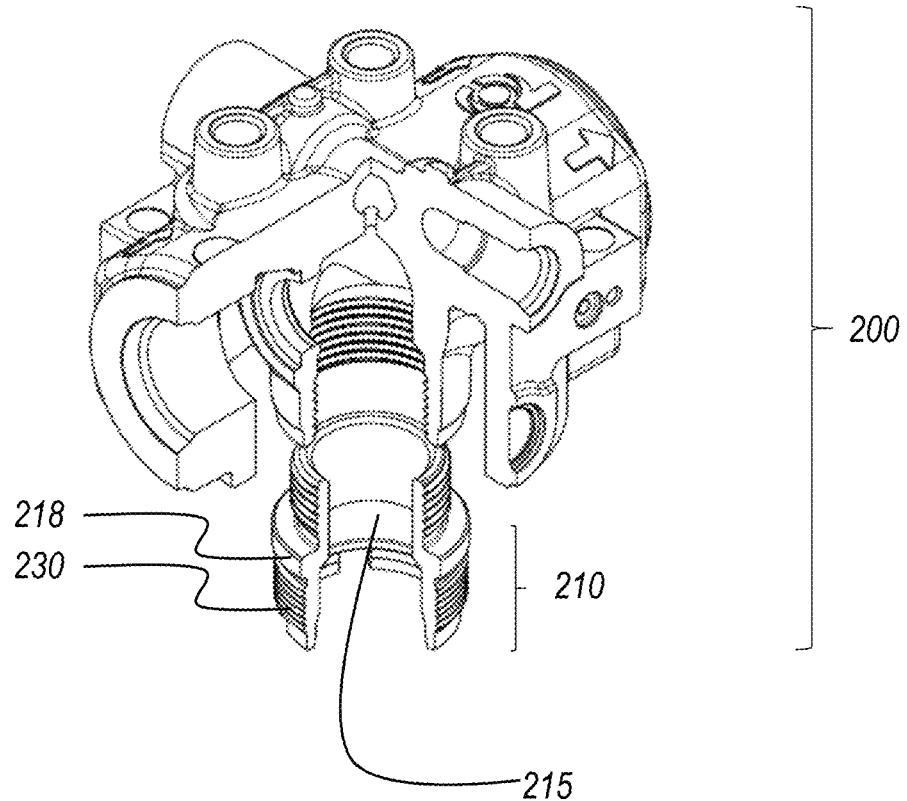
Figure 25:
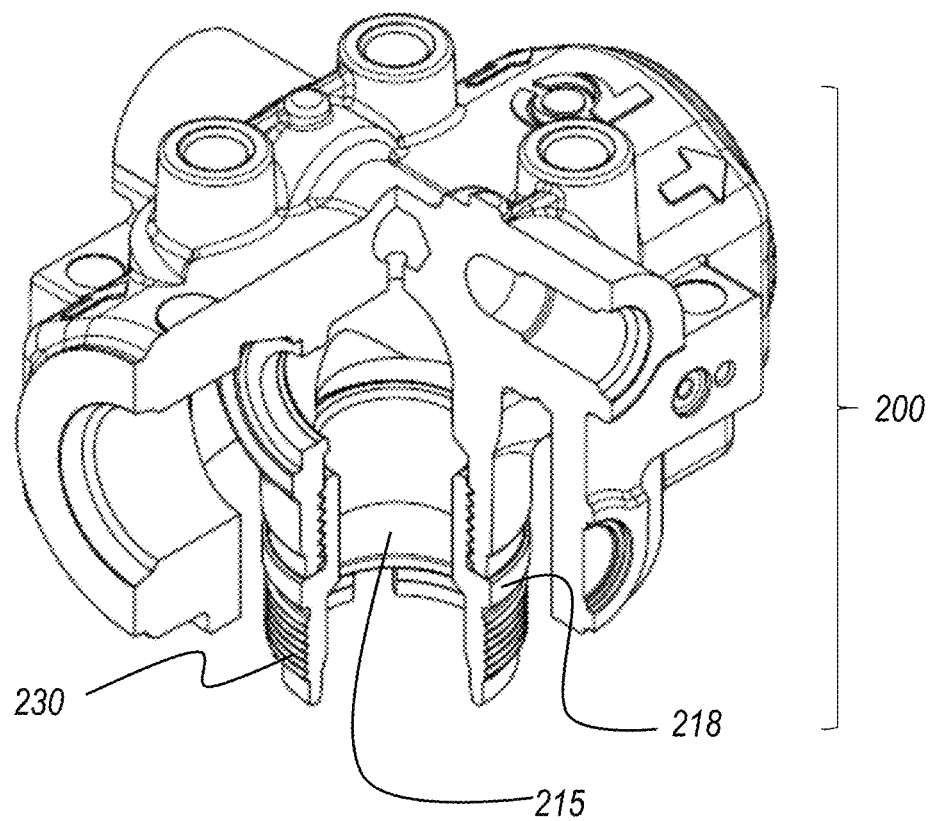

FIGS. 23-25 show how an existing machine head 201 can be adapted for use in accordance with the present invention, thus forming the equivalent of the head 200 as describe in conjunction with the previous figures. This can be achieved by replacing the standard insert that forms the spout (externally threaded cylinder, not shown) by an insert 202 that has features in accordance with the present invention. In particular, the insert 202 has an upper threaded portion configured to engage in a lasting manner with the machine head 201, and a lower portion which forms the head inlet cylinder 210 with outer thread 230. The head inlet cylinder 210 has an inner surface 215 arranged to engage with the outwardly facing seal of the outlet tube of a fluid treatment device, as described above. The inlet tube 210 of the spud shown in FIGS. 23-25 is shaped with a shoulder or flange 218, which prevents screwing on any internally threaded element (such as the threaded bore 130) beyond the point at which the uppermost thread abuts the shoulder or flange 218.

It is noted that the diameter of the head inlet cylinder 210 is typically greater than the corresponding diameter of a standard (or legacy) snout, as it needs to internally accommodate the outlet tube of the spin-on fluid treatment device. Accordingly, embodiments of the spin-on fluid treatment device according to the present invention will have a threaded bore adapted to a thread size of, for example, M26, where legacy spin-on devices would have a thread size of, for example, M22.

Figure 26:
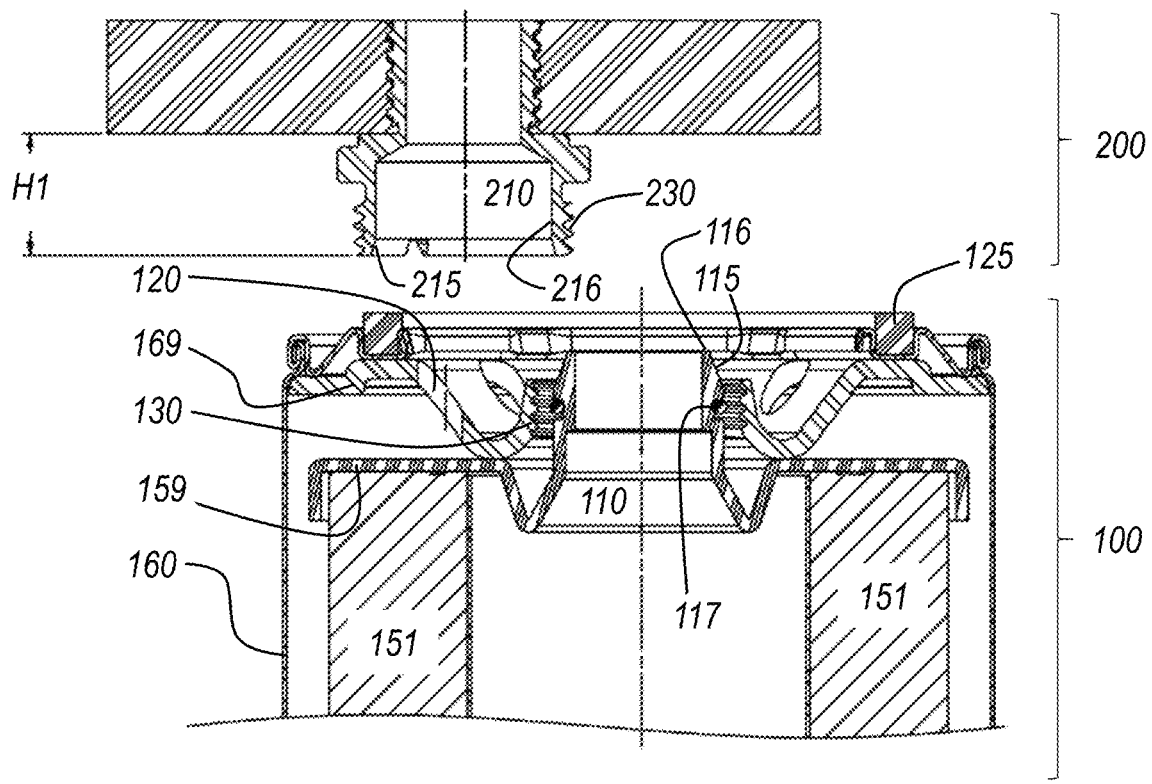
FIGS. 26-28 show schematic cross-sectional views that illustrate the top portion of an embodiment of the spin-on fluid treatment device according to the present disclosure.
Figure 27:
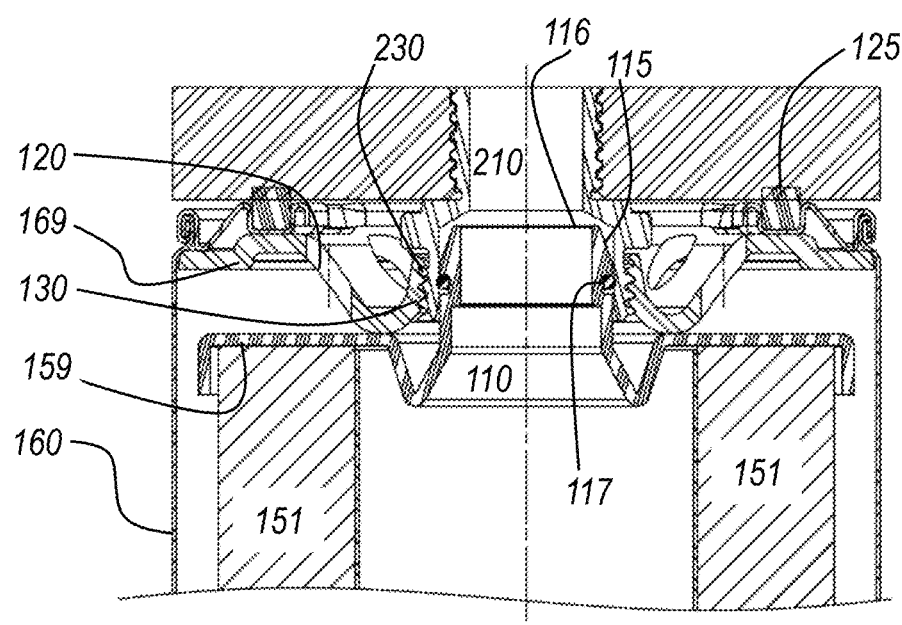
Figure 28:
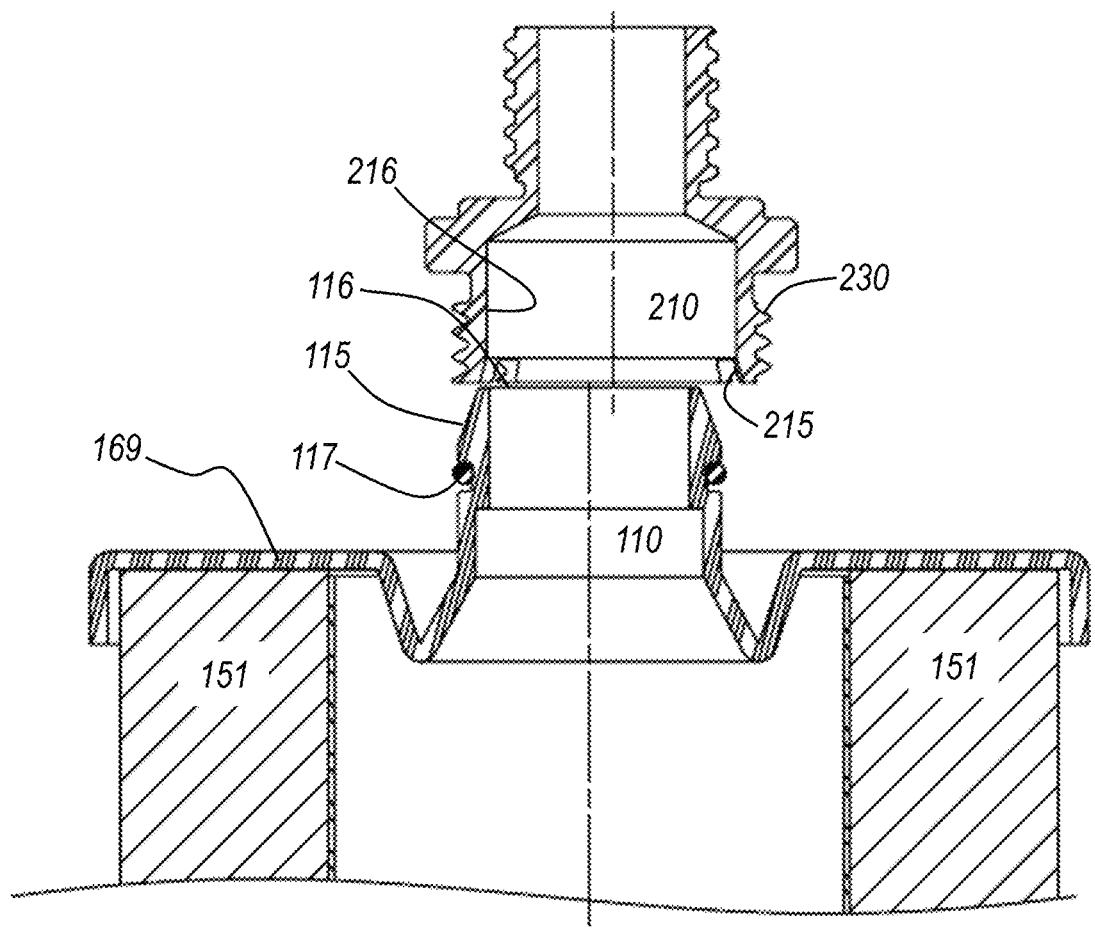

FIGS. 26-28 illustrate the top portion (including a top surface formed by a baffle plate/cover piece 169 seamed onto a main body 160) of an embodiment of the spin-on fluid treatment device 100 according to the present disclosure, in cross-section, disengaged, fully engaged, and in an intermediate position prior to full alignment, respectively.

In one aspect, the outlet tube 110 is formed as a tubular structure, preferably made of plastic, the wall 115 of which is tapered at the open top end 116 so as to form a frusto-conical surface. In one aspect, the tapered or frustoconically shaped sidewall 115 extends axially beyond the most distal end of the threaded bore 130 such that the sidewall 115 can function as an alignment feature with the machine's inlet tube 210. Such a configuration enables the threaded bore 130 of the treatment device 100 to be more easily aligned with and threaded onto the outer thread 230 of the head 200. As can be most easily seen at FIG. 28, even if the treatment device 100 is initially misaligned with the head 200, the tapered sidewall 115 will guide the treatment device 100 into a centered position by interacting with the slanted inner surface 215 of the machine's inlet tube 210 before engaging contact between the threads is made. FIG. 27, shows a state in which the threaded bore 130 and the outer thread have been engaged after the sidewall 115 has performed this alignment function. It is noted that the sidewall 115 could be provided with a curved or rounded shape (e.g. truncated dome shape) while the inner surface 215 could be provided with a curved or rounded shape as well.

As mentioned previously for the other embodiments, the design disclosed in FIGS. 26-28 also functions to isolate the threaded connection 130+230 from the clean side of the treatment device 100 via the operation of a seal (e.g. seal 117 acting against surface 216). As the sidewall 115 extends beyond the threaded bore 130, the sidewall 115 is necessarily inserted into the inlet tube 210 before the threads 130, 230 are engaged. Thus, the alignment feature that the sidewall 115 provides further enhances the isolation function of the seal 117, and further ensures that any burrs on the threads 130, 230 that may become dislodged during the threading operation are prevented from entering into the clean side of the treatment device 100.

Referring to FIG. 26, it can be seen that the inlet tube 210 projects at a height H1 beyond the face of the machine 200 against which the seal 125 forms a seal. Due to the configuration shown at FIGS. 26-28, this height can be significantly reduced in comparison to some prior art systems which have an alignment feature associated with the head 200. For example, H1 can be as little as 17 mm while some prior art systems require a corresponding height of about 25 mm for a similarly sized cartridge 100 and head 200.

Figure 29:
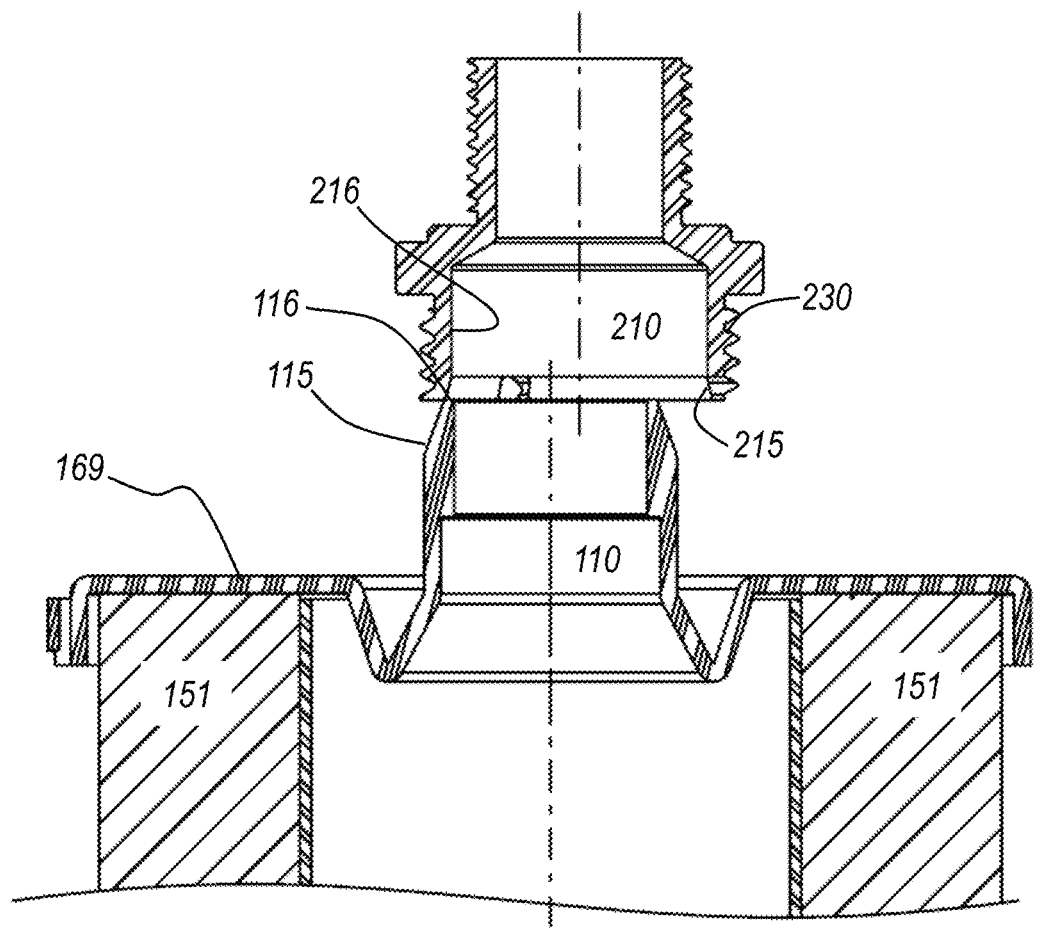
FIG. 29 is a schematic cross-sectional view showing one embodiment of a filter cartridge similar to that shown in FIGS. 26-28 wherein the outlet tube operates as an alignment feature but is provided without a sealing member.

Referring to FIG. 29, an alternative to the configuration shown in FIGS. 26-28 is presented, wherein the outlet tube 110 is essentially the same as that shown at FIGS. 26-28, but where the sealing member 117 and the circumferential groove receiving the sealing member 117 are omitted. As such, in the configuration presented, the outlet tube 110 is not configured to provide a sealing function between the outlet tube 110 and the inlet tube 210. Even so, the tapered or frustoconically shaped sidewall 115 still extends axially beyond the most distal end of the threaded bore 130 such that the sidewall 115 can function as an alignment feature with the machine's inlet tube 210. Thus, it will be clear to a skilled person by the disclosure herein that the outlet tube 110 can be selectively configured to: (1) only form an alignment feature interacting with the inlet tube 210 without including a sealing member for forming a seal with the inlet tube 210; (2) only include a sealing member for forming a seal with the inlet tube 210 without forming an alignment feature interacting the inlet tube 210; or (3) include both a sealing member for forming a seal with the inlet tube 210 and to include an alignment feature interacting with the inlet tube 210. A method of mounting a spin-on filter cartridge onto a filter head can use the above embodiments. The method includes providing a filter head 200 having an externally threaded spud 210; the spud having an internally directed sealing surface 216. A filter cartridge 100, as variously described above, having housing 160 holding a filter element 150 is provided. The housing 160 has a cover piece 169 with a central bore 130 with internally directed threads; the filter element 150 has an outlet tube 110. The method includes connecting the filter cartridge 100 to the filter head 200 by threadably mating the internal threads of the central bore 130 and the external threads of the spud 210; directing the outlet tube 110 into the spud 210; and forming a seal 116+216 between and against the outlet tube 110 and an internal surface of the spud 210. The method can further include aligning the filter cartridge central bore 130 with the filter head threaded spud with the outlet tube 110 prior to the steps of threading the filter cartridge onto the head and forming the seal 116+216 (or 117+216).

The above includes example principles. Many embodiments can be made using these principles.

The invention claimed is:

1. A spin-on fluid treatment device for removable installation onto a filter head having an inlet tube with outwardly facing threads, the spin-on fluid treatment device comprising:

(a) a housing;
(b) a baffle structure secured to the housing through which an internal bore extends, the internal bore having a threaded portion and an unthreaded portion, the unthreaded portion being located between the threaded portion and a top surface of the baffle structure;
(c) at least one inlet orifice radially removed from the internal bore;
(d) an axial seal member surrounding the at least one inlet orifice;
(e) an outlet tube at least partially disposed inside and spaced from the internal bore in a concentric position; and
(f) a treatment medium arranged inside the housing and arranged to treat fluids entering through the at least one inlet orifice and leaving through the outlet tube.

2. The spin-on fluid treatment device of claim 1, wherein the outlet tube includes a sealing member presenting a sealing surface in a radially outward direction.

3. The spin-on fluid treatment device of claim 2, wherein the sealing member is an O-ring.

4. The spin-on fluid treatment device of claim 2, wherein the sealing member is disposed within an interior area defined by the threaded portion of the internal bore.

5. The spin-on fluid treatment device of claim 1, further including a first end cap secured to an end of the treatment medium, wherein the outlet tube is secured to the first end cap.

6. The spin-on fluid treatment device of claim 5, wherein the outlet tube and the first end cap are integrally formed together as a single component to form an outlet structure.

7. The spin-on fluid treatment device of claim 6, wherein a portion of the baffle structure extends into an annulus defined by the outlet structure.

8. The spin-on fluid treatment device of claim 6, wherein the outlet structure defines an annular space extending into an interior space defined by the treatment medium.

9. The spin-on fluid treatment device of claim 1, wherein the outlet tube extends between an inlet end and an outlet end, and wherein the outlet tube narrows such that the outlet end has a smaller dimension than a corresponding dimension at the inlet end.

10. The spin-on fluid treatment device of claim 9, wherein the outlet tube has a frustoconical shape.

\* \* \* \* \*

UNITED STATES PATENT AND TRADEMARK OFFICE
CERTIFICATE OF CORRECTION

| | |
|---|---|
| PATENT NO. | : 12,161,959 B2 |
| APPLICATION NO. | : 17/302790 |
| DATED | : December 10, 2024 |
| INVENTOR(S) | : Gert Willems |

Page 1 of 1

It is certified that error appears in the above-identified patent and that said Letters Patent is hereby corrected as shown below:

In the Specification

Column 1, Line 9: "Ser. No. 16/100,804 claims" should read --Ser. No. 16/100,894 claims--

Signed and Sealed this
Twenty-second Day of April, 2025

Coke Morgan Stewart
*Acting Director of the United States Patent and Trademark Office*